(12) United States Patent
Watanabe et al.

(10) Patent No.: US 11,355,990 B2
(45) Date of Patent: Jun. 7, 2022

(54) DRIVE DEVICE

(71) Applicant: MITSUBA Corporation, Gunma (JP)

(72) Inventors: Tetsuya Watanabe, Gunma (JP); Tatsuyuki Saito, Gunma (JP); Yohei Masuda, Gunma (JP); Satomi Watanabe, Gunma (JP)

(73) Assignee: MITSUBA Corporation, Gunma (JP)

( * ) Notice: Subject to any disclaimer, the term of this patent is extended or adjusted under 35 U.S.C. 154(b) by 3 days.

(21) Appl. No.: 16/756,126

(22) PCT Filed: Oct. 2, 2018

(86) PCT No.: PCT/JP2018/036894
§ 371 (c)(1),
(2) Date: Apr. 15, 2020

(87) PCT Pub. No.: WO2019/077996
PCT Pub. Date: Apr. 25, 2019

(65) Prior Publication Data
US 2020/0244133 A1 Jul. 30, 2020

(30) Foreign Application Priority Data

Oct. 16, 2017 (JP) .............................. JP2017-200265
May 25, 2018 (JP) .............................. JP2018-100946

(51) Int. Cl.
*H02K 5/10* (2006.01)
*H02K 7/00* (2006.01)
*B60K 7/00* (2006.01)

(52) U.S. Cl.
CPC ............. *H02K 5/10* (2013.01); *B60K 7/0007* (2013.01); *H02K 7/006* (2013.01); *B60K 2007/0061* (2013.01)

(58) Field of Classification Search
CPC ........ H02K 5/10; H02K 7/006; B60K 7/0007; B60K 2007/0061
See application file for complete search history.

(56) References Cited

U.S. PATENT DOCUMENTS

| 5,014,800 A | 5/1991 | Kawamoto et al. |
| 2003/0217878 A1 | 11/2003 | Etzioni et al. |

(Continued)

FOREIGN PATENT DOCUMENTS

| JP | S5892855 | 6/1983 |
| JP | H0617352 | 3/1994 |
| JP | H0796752 | 4/1995 |
| JP | H07327331 | 12/1995 |

(Continued)

OTHER PUBLICATIONS

"International Search Report (Form PCT/ISA/210) of PCT/JP2018/036894," dated Jan. 8, 2019, with English translation thereof, pp. 1-4.

(Continued)

*Primary Examiner* — Erez Gurari
(74) *Attorney, Agent, or Firm* — JCIPRNET

(57) ABSTRACT

This drive device is provided with a motor section (2) and a wheel (102) which is connected to the output section (44) of the motor section (2) and which rotates. The wheel (102) has a circular plate-shaped disk section (104) which is affixed to the output section (44), and a rim section (105) which extends in the axial direction of the output section (44) from the outer periphery of the disk section (104) and on which a tire (103) is mounted. The disk section (104) is provided with a rib (116) surrounding the periphery of the motor section (2).

5 Claims, 12 Drawing Sheets

(56) References Cited

U.S. PATENT DOCUMENTS

| | | | | |
|---|---|---|---|---|
| 2004/0256932 | A1* | 12/2004 | Kurosawa | H02K 5/1732 |
| | | | | 310/89 |
| 2013/0048394 | A1* | 2/2013 | Su | B62M 6/65 |
| | | | | 180/60 |
| 2014/0128192 | A1* | 5/2014 | Korenaga | B60K 17/046 |
| | | | | 475/5 |
| 2016/0285339 | A1* | 9/2016 | Smith | H02K 5/10 |
| 2016/0318483 | A1* | 11/2016 | Kimura | B60S 1/166 |
| 2018/0287451 | A1* | 10/2018 | Wang | H02K 15/0006 |
| 2019/0036412 | A1* | 1/2019 | Harada | H02K 1/185 |
| 2019/0165638 | A1* | 5/2019 | Wang | F04D 13/086 |
| 2020/0244133 | A1* | 7/2020 | Watanabe | H02K 7/006 |
| 2020/0282822 | A1* | 9/2020 | Oh | H02K 7/085 |
| 2021/0229228 | A1* | 7/2021 | Yamahata | B23Q 1/0027 |

FOREIGN PATENT DOCUMENTS

| | | |
|---|---|---|
| JP | H0833256 | 2/1996 |
| JP | 2000297831 | 10/2000 |
| JP | 2015113076 | 6/2015 |

OTHER PUBLICATIONS

"Office Action of Japan Counterpart Application", dated Nov. 2, 2021, with English translation thereof, p. 1-p. 7.
"Office Action of China Counterpart Application", dated Nov. 1, 2021, with English translation thereof, p. 1-p. 14.
"Office Action of China Counterpart Application" with English translation thereof, dated Feb. 25, 2022, p. 1-p. 12.

* cited by examiner

DRIVE DEVICE

TECHNICAL FIELD

The present invention relates to a drive device.

This present application is a 371 application of the international PCT application serial no. PCT/JP2018/036894, filed on Oct. 2, 2018, and this present application claims priority based on Japanese Patent Application No. 2017-200265 filed in Japan on Oct. 16, 2017 and Japanese Patent Application No. 2018-100946 filed in Japan on May 25, 2018, entire of which will be incorporated herein.

BACKGROUND ART

For example, an in-wheel motor in which an electric motor is accommodated inside a rim section of a wheel in an electric vehicle or the like using the motor as a drive source in order to enhance transmission efficiency is known. As the in-wheel motor, there is an in-wheel motor in which the wheel is secured to an output shaft (rotation shaft) of the motor and the wheel and the shaft rotate together (see Patent Literature 1, for example).

CITATION LIST

Patent Literature

[Patent Literature 1]
Japanese Patent Laid-Open No. 2000-297831

SUMMARY

Technical Problem

According to the drive device as in the related art described above, the output shaft of the motor extends out of the motor case (motor casing), and dust, rainwater, and the like are likely to enter the inside from between the motor case and the output shaft.

In the case of a so-called motor with a decelerator in which a drive section is configured to decelerate a motor and rotation of the motor and output the decelerated rotation, failure may occur if dust or rainwater enters the decelerating section.

Thus, the present invention provides a drive device with excellent dustproof and waterproof properties.

Solution to Problem

In order to solve the aforementioned problems, according to a first aspect of the present invention, there is provided a drive device including: a motor section which has a motor case formed to have a reduced diameter via gradual step differences in one direction; a decelerating section which is disposed on a furthest side of the motor case in the one direction and which has an output shaft configured to decelerate and output an output of the motor section; and a rotating member which is disposed on a side of the one direction beyond the decelerating section and is coupled to and rotates with the output shaft, in which at least either the motor section or the rotating member is provided with a waterproof cover formed to surround a periphery of the motor case, and an inner peripheral surface of the waterproof cover is formed into a stepped shape to follow an outer peripheral surface of the motor case.

In the drive device that has the motor section and the decelerating section, the motor case is formed to have a reduced diameter with gradual step differences in the one direction (toward the side of the rotating member). Also, the inner peripheral surface of the waterproof cover is formed into the stepped shape to follow the outer peripheral surface of the motor case, and it is thus possible to form the clearance between the motor case and the waterproof cover with a complicated shape. In other words, it is possible to complicate an entrance path of dust, rainwater, and the like entering inside from between the motor case and the waterproof cover. Therefore, even the drive device that has the motor section and the decelerating section can reliably prevent dust and rainwater from entering the decelerating section, and it is thus possible to provide a drive device with excellent dustproof and waterproof properties.

According to a second aspect of the present invention, the rotating member is a wheel which has a disk section with a disk shape which is secured to the output shaft, and a rim section, which extends in an axial direction of the output shaft from an outer peripheral portion of the disk section, to which a tire is attached, the disk section is provided with a rib which surrounds a periphery of the motor section, and the rib is the waterproof cover, in the drive device according to the first aspect of the present invention.

With this configuration, it is possible to prevent dust, rainwater, and the like from coming in direct contact with the motor section using the rib. Thus, it is possible to provide a drive device with excellent dustproof and waterproof properties.

Since it is not necessary to separately provide a cover or the like at the motor section, it is possible to enhance versatility, to curb an increase in size of the motor section, and to prevent manufacturing costs of the motor section from increasing.

According to a third aspect of the present invention, the motor section is provided with a first motor cover with a tubular shape which projects toward the disk section, the first motor cover and the rib at least partially overlap in a radial direction of the output shaft, and the first motor cover and the rib are the waterproof cover, in the drive device according to the second aspect of the present invention.

By using the motor cover and the rib together in this manner, it is possible to downsize and simplify the motor cover as compared with a case in which the entire motor section is covered with the motor cover.

It is possible to form a labyrinth with the motor cover and the rib and thereby to further complicate an entrance path of dust, rainwater, and the like entering the inside between the motor section and the rib. Thus, it is possible to more reliably provide a drive device with excellent dustproof and waterproof properties.

According to a fourth aspect of the present invention, the motor section is provided with a second motor cover, the second motor cover includes a cover main body which is formed into a stepped shape to follow the outer peripheral surface of the motor case, and an output shaft cover section which is formed into a tubular shape to surround a periphery of the output shaft extending from the cover main body to the side of the one direction, and the second motor cover is the waterproof cover, in the drive device according to the first aspect of the present invention.

By forming the shape of the second motor cover into the stepped shape to follow the outer peripheral surface of the motor case in this manner, it is possible to minimize an occupation space of the second motor cover and to prevent dust, rainwater, and the like from coming in direct contact with the motor section. Thus, it is possible to provide a drive device with a reduced size and with excellent dustproof and waterproof properties.

According to a fifth aspect of the present invention, the rotating member has a sealing section which covers the output shaft cover section from the side of the one direction, and the sealing section and the output shaft cover section form a labyrinth section that is an annular clearance, in the drive device according to the fourth aspect of the present invention.

With this configuration, the entrance path of rainwater and the like from between the output shaft cover section and the sealing section becomes complicated. Thus, it is possible to curb entrance of dust, rainwater, and the like into the motor section from between the output shaft cover section and the sealing section. Thus, it is possible to provide a drive device with further excellent dustproof and waterproof properties.

According to a sixth aspect of the present invention, the motor section and the decelerating section are disposed such that an axial direction follows a horizontal direction, a drainage section is formed at a lower part of the cover main body in a weight direction, the drainage section includes a drainage hole which is formed in a side surface of the cover main body, and a box-shaped protection cover which is formed in the side surface of the cover main body to cover the drainage hole from an outside in a radial direction and which has one surface in the horizontal direction opened, in the drive device according to the fourth aspect or the fifth aspect of the present invention.

With this configuration, it is possible to quickly discharge rainwater from the drainage section even in a case in which the rainwater and the like enters the second motor cover.

The drainage section has the box-shaped protection cover to cover the drainage hole. Because the protection cover has only the one surface in the horizontal direction opened, it is possible to curb entrance of rainwater and the like from the outside into the second motor cover via the drainage section while smoothly discharging the rainwater to the outside via the drainage hole. Thus, it is possible to provide a drive device with further excellent dustproof and waterproof properties.

Advantageous Effects of Invention

According to the aforementioned drive device, it is possible to prevent dust, rainwater, and the like from coming in direct contact with the motor section using the waterproof cover. Thus, it is possible to provide a drive device with excellent dustproof and waterproof properties.

DESCRIPTION OF THE EMBODIMENTS

Next, embodiments of the present invention will be described on the basis of drawings.

Figure 1:
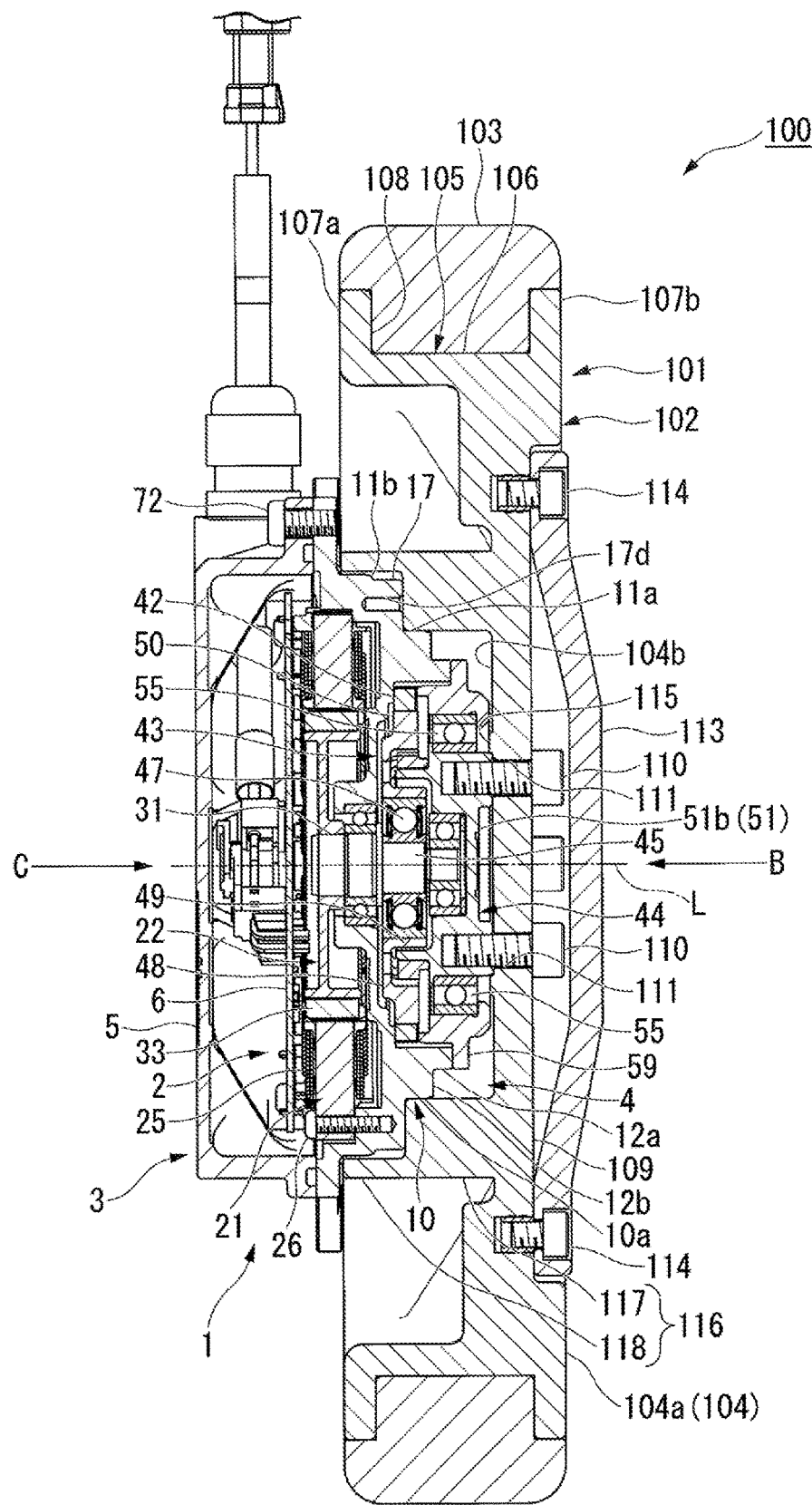
FIG. 1 is a sectional view of a vehicle wheel drive device according to a first embodiment of the present invention.

First Embodiment (Vehicle Wheel Drive Device)
FIG. 1 is a sectional view of a vehicle wheel drive device 100.

As illustrated in FIG. 1, the vehicle wheel drive device 100 includes a motor 1 with a decelerator and a drive wheel 101 as a rotating member that is attached to an output section 44 of the motor 1 with the decelerator, which will be described later. The vehicle wheel drive device 100 is attached to a vehicle body, which is not illustrated, and is used to cause the vehicle body to travel.

As an attachment direction of the vehicle wheel drive device 100, the vehicle wheel drive device 100 is attached such that a motor axial line L of the motor 1 with the decelerator follows a vehicle width direction (horizontal direction) and the motor 1 with the decelerator is disposed inside the vehicle body in the vehicle width direction, for example. In the following description, the direction that follows the motor axial line L may be simply referred to as an axial direction or a vehicle width direction of the vehicle body, the direction around the motor axial line L may be simply referred to as a circumferential direction, and the direction that perpendicularly intersects the motor axial line L and the circumferential direction may be simply referred to as a radial direction.

Figure 2:
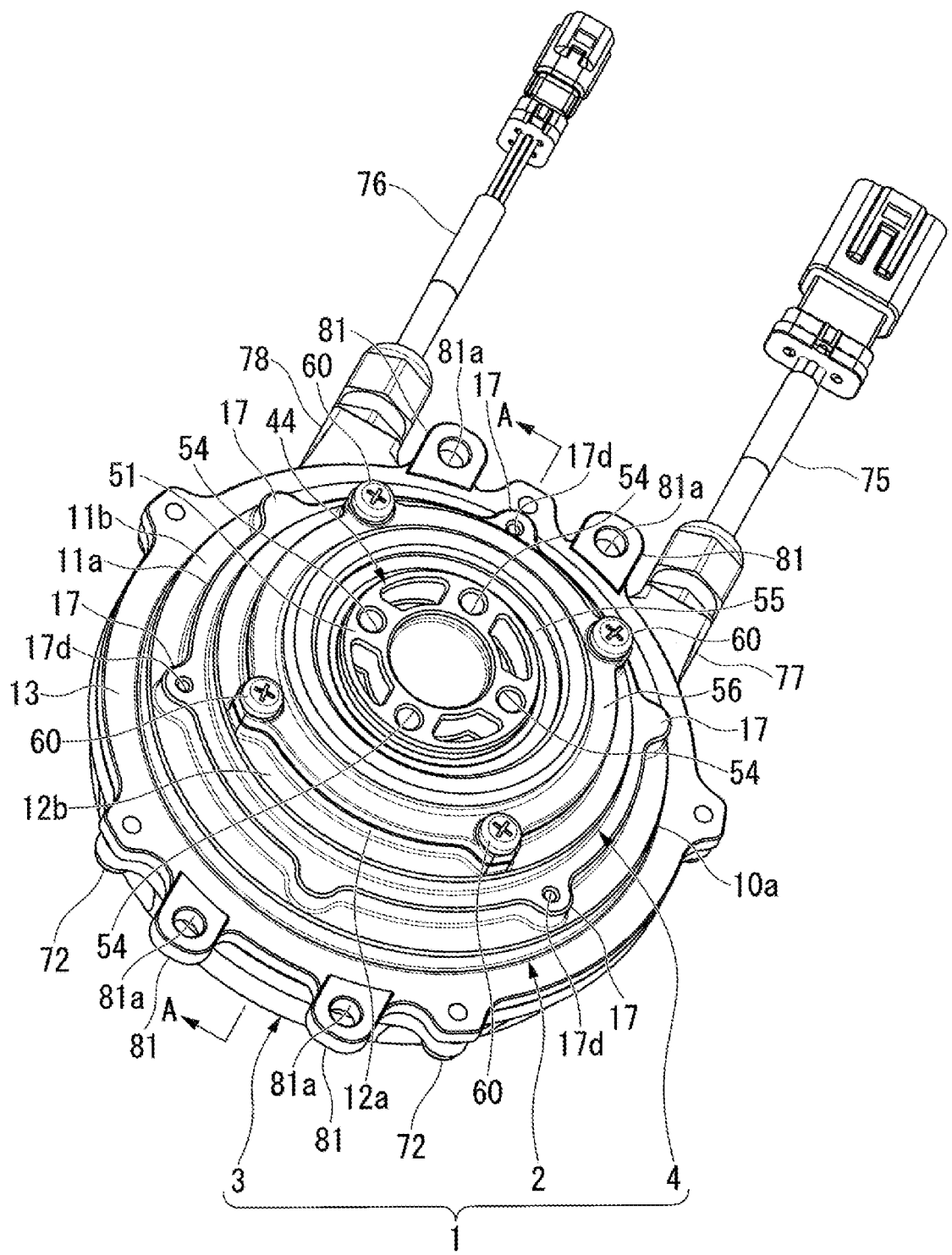
FIG. 2 is a perspective view of a motor with a decelerator according to the first embodiment of the present invention.
Figure 3:
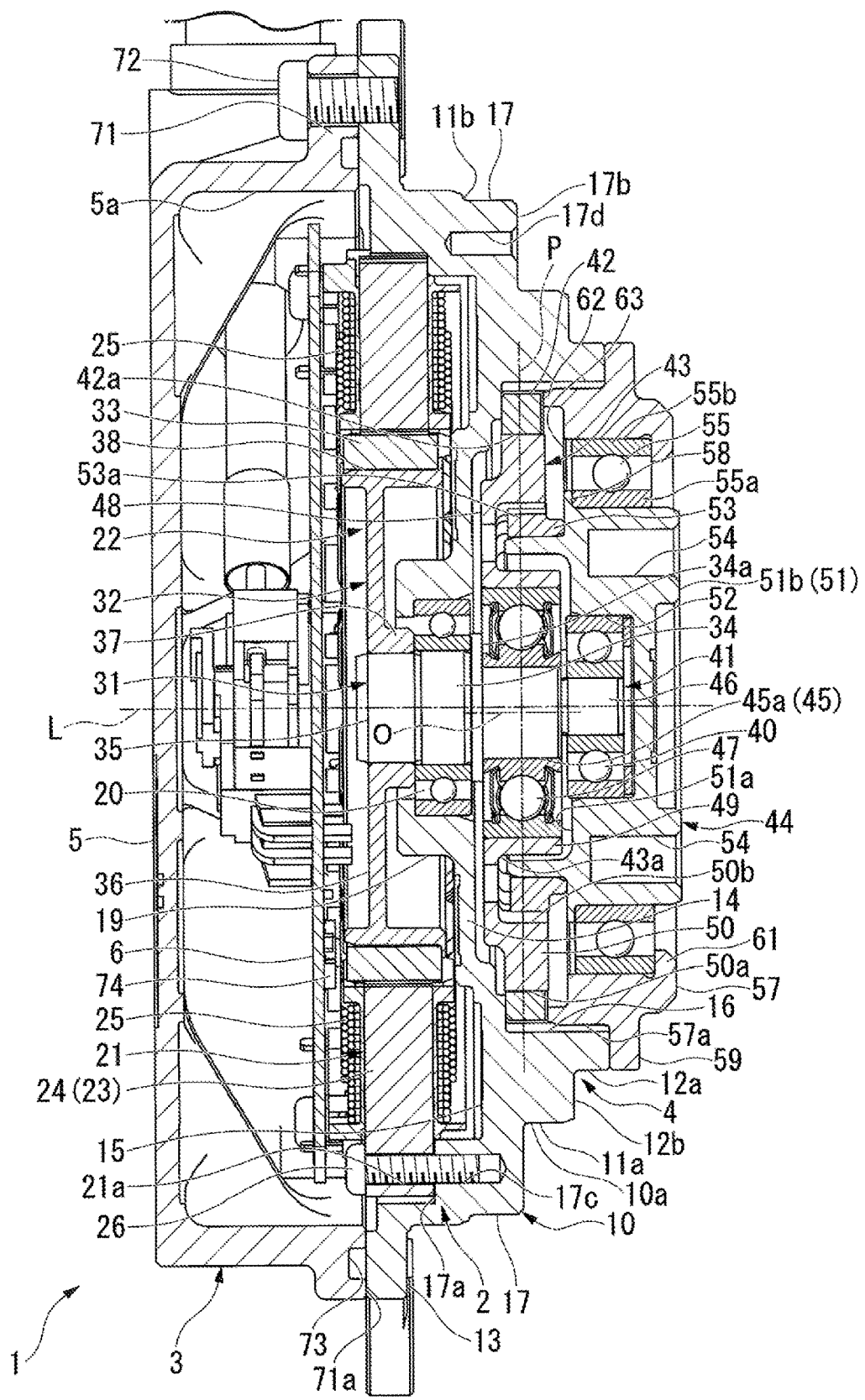
FIG. 3 is a sectional view along the line A-A in FIG. 2.

(Motor with Decelerator)
FIG. 2 is a perspective view of the motor 1 with the decelerator. FIG. 3 is a sectional view along the line A-A in FIG. 2.

As illustrated in FIG. 1 to FIG. 3, the motor 1 with the decelerator includes a flat-shaped motor section 2 configured as a so-called DC brushless motor, a control section 3 that performs drive control of the motor section 2, and a decelerating mechanism 4 that receives a rotation force of the motor section 2 and is driven. In the motor 1 with the decelerator, the control section 3, the motor section 2, and the decelerating mechanism 4 are aligned and disposed in this order.

(Motor Section)
(Casing)
The motor section 2 is accommodated in a substantially stepped cylindrical casing 10. An outer peripheral surface 10a of the casing 10 has two reduced diameter sections 11a and 12a (a first reduced diameter section 11a and a second reduced diameter section 12a) with gradually reduced diameters via two step difference surfaces 11b and 12b (a first step difference surface 11b and a second step difference surface 12b) as the outer peripheral surface 10a further separates from the control section 3. In other words, the first reduced diameter section 11a at which a reduced diameter is formed as compared with the outer peripheral surface 10a of the casing 10 is formed via the first step difference surface 11b formed on the side of the control section 3 (the left side in FIG. 3) beyond substantially the center in the axial direction. The second reduced diameter section 12a in which a reduced diameter as compared with the first reduced diameter section 11a is formed via the second step difference surface 12b is formed in the casing 10.

A plurality of (six in the embodiment, for example) bolt seats 17 that project outward in the radial direction and are disposed on the first step difference surface 11b are molded integrally with the first reduced diameter section 11a. The bolt seats 17 are disposed at equal intervals in the circumferential direction. Among these bolt seats 17, female screw sections 17c for a stator are engraved in surfaces (rear surfaces) 17a of the three bolt seats 17, for example, on the side of the control section 3. These female screw sections 17c for the stator are disposed at equal intervals in the circumferential direction. The female screw sections 17c for the stator are used to fasten and secure a stator 21, which will be described later, to the casing 10. Female screw sections 17d for an external device are engraved in the other surfaces (front surface) 17b on the side opposite to the surfaces 17a of the three bolt seats 17, for example, in which no female screw sections 17c for the stator are engraved. These female screw sections 17d for the external device are used to fasten and secure an external device (a motor cover 121 according to a second embodiment described later, for example), which is not illustrated.

An outer flange section 13 stretching outward in the radial direction is molded integrally with an end of the outer peripheral surface 10a of the casing 10 on the side of the control section 3. The outer flange section 13 is adapted to fasten and secure the casing 10 to a control case 5 of the control section 3, which will be described later.

At each of both sides of the outer flange section 13 from the center thereof in the radial direction, two plate-shaped attachment stays 81 are integrally molded. Each attachment stay 81 is formed to project outward in the radial direction. The attachment stays 81 are adapted to fasten and secure the motor 1 with the decelerator (casing 10) to an external device (a vehicle body which is not illustrated, for example), which is not illustrated. Through-holes 81a that penetrate through the attachment stays 81 in the thickness direction are formed in the attachment stays 81. Bolts or the like, which are not illustrated, are inserted into the through-holes 81a.

A partitioning wall section 14 stretching inward in the radial direction is molded integrally with the inner peripheral surface of the casing 10 in the vicinity of the first step difference surface 11b. The casing 10 on the side of the control section 3 with the substantially disk-shaped partitioning wall section 14 extending in the radial direction interposed therebetween is configured as a motor accommodation section 15 while the casing 10 on the side opposite to the motor accommodation section 15 is configured as a gear accommodation section 16. A substantially cylindrical bearing housing 19 is integrally molded at the center of the partitioning wall section 14 in the radial direction. The bearing housing 19 is provided with a ball bearing 20 for rotatably supporting a rotor 22 of the motor section 2, which will be described later.

The motor section 2 is accommodated in the motor accommodation section 15. The motor section 2 is configured of a substantially ring-shaped stator 21 and a rotor 22 that is rotatably provided inside the stator 21 in the radial direction.

The stator 21 has a stator core 23 formed by laminating a plurality of electromagnetic steel plates or pressure-molding a soft magnetic powder. A bolt insertion hole 21a (see FIG. 3) is formed in an outer peripheral portion of the stator core 23 at a position corresponding to the female screw section 17c in the casing 10. A bolt 26 is inserted into the bolt insertion hole 21a from the side of the control section 3 (the left side in FIG. 3). By screwing the bolt 26 into the female screw section 17c for the stator in the casing 10, the stator 21 is fastened and secured to the motor accommodation section 15 in the casing 10.

A plurality of teeth 24 projecting inward in the radial direction is aligned and formed on the inner peripheral surface of the stator core 23. A coil 25 is wound around the teeth 24. If power is supplied to the coil 25, then a predetermined magnetic field is generated in the stator 21.

The rotor 22 includes a rotation shaft 31 that is rotatably supported by the partitioning wall section 14 via the ball bearing 20, a rotor core 32 that is fitted onto and secured to the rotation shaft 31, and a ring magnet 33 that is secured to the rotor core 32. An axial line of the rotation shaft 31 serves as a motor axial line L.

The rotation shaft 31 is configured of a support shaft 34 that is supported by the ball bearing 20, an attachment shaft 35 that is formed at an end of the support shaft 34 from the side of the control section 3 (the left end in FIG. 3) to have a slightly reduced diameter as compared with the support shaft 34 and that extends in the axial direction, and a flange section 34a that is molded integrally with an end of the support shaft 34 on the side opposite to the attachment shaft 35.

The outer diameter of the flange section 34a is set to be larger than the inner diameter of the ball bearing 20. In this manner, deviation of the rotation shaft 31 in the axial direction is restricted.

The rotor core 32 is fitted onto and secured to the attachment shaft 35. The rotor core 32 has a substantially disk-shaped core main body 36 extending in the radial direction. A substantially cylindrical inner peripheral wall 37 is formed at the center of the core main body 36 in the radial direction to project toward the side of the ball bearing 20 in the axial direction. The inner peripheral wall 37 is fitted onto and secured to the support shaft 34.

A substantially cylindrical outer peripheral wall 38 is molded integrally with the outer peripheral portion of the core main body 36 in the axial direction. The height of the outer peripheral wall 38 in the axial direction is set to be slightly larger than the thickness of the stator core 23 in the axial direction. All inner end surfaces of the teeth 24 of the stator core 23 in the radial direction face the outer peripheral wall 38 of the rotor core 32 in the radial direction. The ring magnet 33 is fitted onto and secured to the outer peripheral surface of such an outer peripheral wall 38. The ring magnet 33 is formed into a substantially cylindrical shape corresponding to the outer peripheral wall 38. A plurality of N poles and S poles are alternately magnetized in the circumferential direction at the ring magnet 33.

The magnet secured to the outer peripheral wall 38 is not limited to the ring magnet 33, and magnets split in the circumferential direction may also be employed. In this case, the magnets are secured to the outer peripheral wall 38 such that magnetic poles are aligned in order in the circumferential direction.

(Decelerating Mechanism)

An eccentric shaft 41 is molded integrally with an end of the rotation shaft 31 on the side of the decelerating mechanism 4 (left end) in the axial direction. The eccentric shaft 41 configures a part of the decelerating mechanism 4. The decelerating mechanism 4 is configured as a so-called hypocycloid decelerating mechanism. The decelerating mechanism 4 includes a ring gear 42 that is secured to the gear accommodation section 16 of the casing 10, a rocking gear 43 that is engaged with the ring gear 42, and the output section 44 that is engaged with the rocking gear 43, in addition to the eccentric shaft 41.

The eccentric shaft 41 is configured of an eccentric section 45 that is formed on the flange section 34a of the rotation shaft 31 and a support shaft 46 that extends in the axial direction from an end of the eccentric section 45 on the side opposite to the flange section 34a. The eccentric section 45 is formed into a substantially columnar shape. Also, an outer peripheral surface 45a of the eccentric section 45 is formed of a cylindrical surface around a position that is eccentric relative to the motor axial line L at a center O. The support shaft 46 is formed such that the axial center thereof conforms to the motor axial line L.

The rocking gear 43 is rotatably supported by the eccentric section 45 via one ball bearing 47. In the rocking gear 43, a substantially disk-shaped rocking gear main body 48 that extends in the radial direction, a substantially cylindrical bearing housing 49 that extends from the center of the rocking gear main body 48 in the radial direction toward a side opposite to the motor section 2 in the axial direction, and a substantially cylindrical tooth wall 50 that is provided to stand from the outer peripheral portion of the rocking gear main body 48 in the same direction as the direction in which the bearing housing 49 is provided to stand are integrally molded. Since the rocking gear 43 is formed, a substantially annular recessed portion 43a that is opened in the side opposite to the motor section 2 (the right side in FIG. 3) when seen from the axial direction is formed between the bearing housing 49 and the tooth wall 50 in the rocking gear 43.

The bearing housing 49 of the rocking gear 43 is rotatably supported by the eccentric section 45 via the ball bearing 47. Outer teeth 50a are formed in the outer peripheral surface, and inner teeth 50b are formed in the inner peripheral surface of the tooth wall 50. Here, the center of the outer teeth 50a in the axial direction, the center of the inner teeth 50b in the axial direction, and the center of the ball bearing 47 in the axial direction are located on the same plane P in the radial direction.

Inner teeth 42a of the ring gear 42 are engaged with the outer teeth 50a of the rocking gear 43. The outer peripheral surface of the ring gear 42 is fitted into and secured to the gear accommodation section 16 of the casing 10. The inner teeth 42a that are concentric with the motor axial line L are formed in the inner peripheral surface of the ring gear 42.

Outer teeth 53a of the output section 44 are engaged with the inner teeth 50b of the rocking gear 43. The output section 44 has a substantially disk-shaped output section main body 51 that extends in the radial direction. A bearing accommodation recessed portion 52 is formed at the center of one surface 51a of the output section main body 51 on the side of the motor section 2 (the left side in FIG. 3) in the radial direction. The ball bearing 40 is accommodated in the bearing accommodation recessed portion 52. A support shaft 46 of the eccentric shaft 41 is rotatably supported by the output section main body 51 via the ball bearing 40.

An outer tooth ring 53 is formed in the one surface 51a of the output section main body 51 to project therefrom. The outer tooth ring 53 is formed to correspond to the recessed portion 43a of the rocking gear 43. The outer tooth ring 53 faces the recessed portion 43a. The inner teeth 42a of the ring gear 42 are engaged with the outer peripheral surface of such an outer tooth ring 53, and outer teeth 53a that are coaxial with the motor axial line L are formed in the outer peripheral surface of the outer tooth ring 53.

The center of the range in which the inner teeth 42a of the ring gear 42 are engaged with the outer teeth 50a of the rocking gear 43 in the axial direction substantially conforms to the center between the inner teeth 42a and the outer teeth 50a in the axial direction. The center of the range in which the inner teeth 50b of the rocking gear 43 are engaged with the outer teeth 53a of the output section 44 in the axial direction substantially conforms to the center between the inner teeth 50b and the outer teeth 53a in the axial direction. In other words, the center of the range in which the inner teeth 42a of the ring gear 42 are engaged with the outer teeth 50a of the rocking gear 43 in the axial direction, the center of the range in which the inner teeth 50b of the rocking gear 43 are engaged with the outer teeth 53a of the output section 44 in the axial direction, and the center of the ball bearing 47 in the axial direction are located on substantially the same plane P in the radial direction.

A plurality of (four in the embodiment, for example) female screw sections 54 are engraved in the other surface 51b of the output section main body 51 on the side opposite to the one surface 51a. The female screw sections 54 fasten and secure the drive wheel 101 to the output section 44.

The output section main body 51 of the output section 44 is rotatably supported by a guide section 56 via a ball bearing 55. An inner wheel 55a of the ball bearing 55 is fitted onto the outer peripheral surface of the output section main body 51. A bearing outer flange section 58 stretching outward in the radial direction from the outer peripheral surface is molded integrally with the end of the output section main body 51 on the side of the rocking gear 43 (the left end in FIG. 3). By the end of the inner wheel 55a of the ball bearing 55 on the side of the rocking gear 43 abutting on the bearing outer flange section 58, movement of the ball bearing 55 to the side of the rocking gear 43 is restricted.

The guide section 56 is configured of a guide main body 57 that is formed into a substantially cylindrical shape and a flange section 59 that is molded integrally with the outer peripheral surface 57a of the guide main body 57 to stretch outward in the radial direction.

The flange section 59 abuts on the end surface of the casing 10 on the side opposite to the control section 3. Also, the flange section 59 is fastened and secured to the casing 10 with a plurality of (four in the embodiment, for example) bolts 60. In this manner, the guide section 56 is secured to the casing 10.

An outer wheel 55b of the ball bearing 55 is fitted into the inner peripheral surface of the guide main body 57. A bearing inner flange section 61 stretching inward in the radial direction from the inner peripheral surface is molded integrally with the end of the guide main body 57 on the side opposite to the rocking gear 43 (the right end in FIG. 3). By the end of the outer wheel 55b of the ball bearing 55 on the side opposite to the rocking gear 43 abutting on the bearing inner flange section 61, movement of the ball bearing 55 to the side opposite to the rocking gear 43 is restricted. The ball bearing 55 is exposed to the outside via an opening of the bearing inner flange section 61 on the side of the inner peripheral edge.

In this manner, the ball bearing 55 is adapted such that the end of the inner wheel 55a of the ball bearing 55 on the side of the rocking gear 43 abuts on the bearing outer flange section 58 of the output section 44. Also, the ball bearing 55 is adapted such that the end of the outer wheel 55b of the ball bearing 55 on the side opposite to the rocking gear 43 abuts on the bearing inner flange section 61 of the guide section 56. In this manner, positioning in the axial direction is performed.

A rib 62 that extends from a portion near the outer peripheral portion toward the side of the rocking gear 43 is molded integrally with the end surface of the guide main body 57 on the side of the rocking gear 43. The rib 62 is formed into a substantially annular shape in a plan view in the axial direction.

The outer diameter of the output section main body 51 of the output section 44 and the inner diameter of the guide main body 57 of the guide section 56 are set such that the ball bearing 55 provided between the main bodies 51 and 57 faces the position at which the inner teeth 42a of the ring gear 42 are engaged with the outer teeth 50a of the rocking gear 43 and the position at which the inner teeth 50b of the rocking gear 43 are engaged with the outer teeth 53a of the output section 44 in the axial direction.

Facing in the axial direction described here means that the position at which the inner teeth 42a of the ring gear 42 are engaged with the outer teeth 50a of the rocking gear 43, the position at which the inner teeth 50b of the rocking gear 43 are engaged with the outer teeth 53a of the output section 44, and the ball bearing 55 are disposed in an aligned manner in the axial direction rather than that they completely face one another in the axial direction.

Also, since the guide main body 57 of the guide section 56 is provided with the rib 62, a clearance is formed inside the rib 62 in the radial direction. In other words, a clearance is formed between the positions at which the inner teeth 42a of the ring gear 42 are engaged with the outer teeth 50a of the rocking gear 43 and the inner teeth 50b of the rocking gear 43 are engaged with the outer teeth 53a of the output section 44 and the ball bearing 55. The clearance is configured as a lubricant retaining section 63. The lubricant retaining section 63 is filled with a lubricant, which is not illustrated. The lubricant has a role in reducing engagement resistance between the inner teeth 42a of the ring gear 42 and the outer teeth 50a of the rocking gear 43 and engagement resistance between the inner teeth 50b of the rocking gear 43 and the outer teeth 53a of the output section 44. Also, the lubricant has a role in reducing sliding resistance of the ball bearing 55.

The ball bearing 55 is exposed to the outside via the opening of the bearing inner flange section 61 of the guide section 56 on the side of the inner peripheral edge. Therefore, it is desirable to provide sealing at least on the surface of the ball bearing 55 on the side of the bearing inner flange section 61. In this manner, it is possible to prevent dust and the like from entering the ball bearing 55 from the outside.

(Control section)

The control section 3 includes the bottomed cylindrical control case 5 and a control substrate 6 that is accommodated in the control case 5. The control case 5 is disposed with an opening portion 5a facing the side of the motor section 2. The outer flange section 71 stretching outward in the radial direction is formed at the opening portion 5a of the control case 5. An end surface 71a of the outer flange section 71 on the side of the motor section 2 abuts on the outer flange section 13 of the casing 10. The outer flange section 71 of the control case 5 and the outer flange section 13 of the casing 10 are fastened and secured to each other with a plurality of bolts 72 (see FIG. 1 and FIG. 2).

An O-ring groove 73 is formed over the entire periphery of the end surface 71a of the outer flange section 71 of the control case 5. Sealing properties between the outer flange section 71 of the control case 5 and the outer flange section 13 of the casing 10 is secured by an O-ring, which is not illustrated, being attached to the O-ring groove 73.

A substantially cylindrical power drawing port 77 from which a power harness 75 connected to the control substrate 6 accommodated in the control case 5, which will be described later, is drawn out and a substantially cylindrical sensor drawing port 78 from which a sensor harness 76 is drawn out are formed at the control case 5 to project outward.

The control substrate 6 is obtained by forming a plurality of conductive patterns (not illustrated) on a so-called epoxy substrate. The control substrate 6 is disposed such that one surface thereof faces the stator 21 and the rotor 22 in the axial direction. A plurality of magnetism detection elements 74 is mounted on the control substrate 6 at positions at which the magnetism detection elements 74 face the ring magnet 33 of the rotor 22 in the axial direction. The magnetism detection elements 74 detect the rotation position of the rotor 22 by detecting a change in magnetism of the ring magnet 33.

A terminal portion of the coil 25 of the stator 21 is connected to the control substrate 6, and a terminal portion of the power harness 75 connected to an outer power supply, which is not illustrated, and a terminal portion of the sensor harness 76 connected to an external control device, which is not illustrated, are connected to the control substrate 6. A capacitor (not illustrated) that smooths a voltage to be applied to the control substrate 6 is mounted on the control substrate 6. A power module (not illustrated) configured of a switching element such as a field effect transistor (FET) configured to control a current to be supplied to the coil 25, for example, may be mounted on the control substrate 6.

(Drive Wheel)

Figure 4:
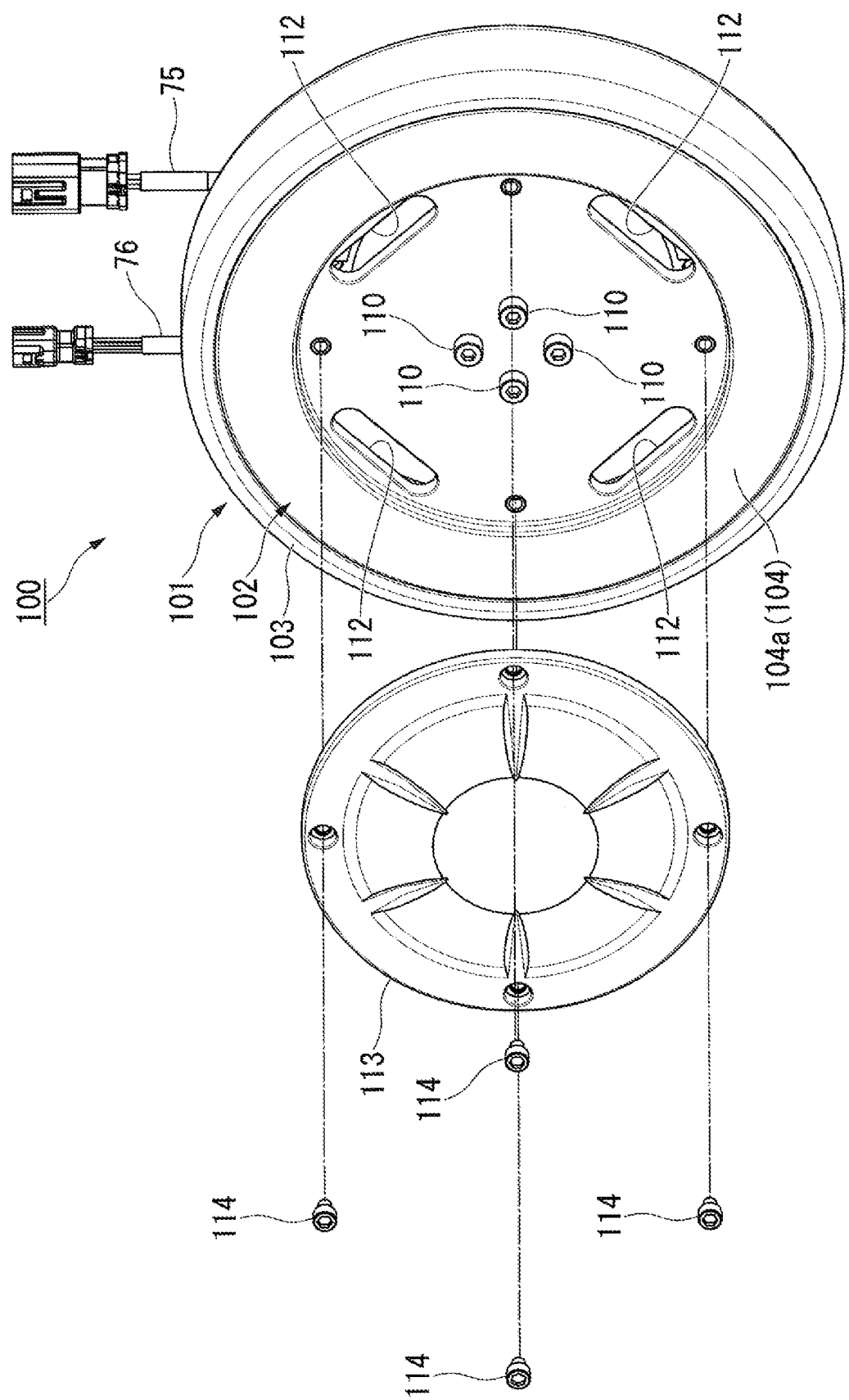
FIG. 4 is a partially exploded perspective view of the vehicle wheel drive device from the direction B in FIG. 1.

FIG. 4 is a partially exploded perspective view of the vehicle wheel drive device 100 when seen from the direction B in FIG. 1.

As illustrated in FIG. 1 and FIG. 4, the drive wheel 101 includes a wheel 102 and a tire 103 assembled with a rim section 105 of the wheel 102.

In the wheel 102, a disk section 104 formed into a substantially disk shape that is concentric with the motor axial line L and the rim section 105 that projects from the outer peripheral edge of the disk section 104 to the side of the motor 1 with the decelerator (the left side in FIG. 1) are integrally molded.

In the rim section 105, a substantially cylindrical rim main body 106 that is concentric with the motor axial line L and two outer flange sections 107a and 107b stretching in the radial direction from both ends of the rim main body 106 in the axial direction are integrally molded. The rim main body 106 and the two outer flange sections 107a and 107b form a tire accommodation recessed portion 108, the outside of which in the radial direction is opened. The tire 103 is attached to the wheel 102 such that the tire 103 is accommodated in the tire accommodation recessed portion 108.

A recessed portion 109 that has a substantially circular shape in a plan view in the axial direction is formed at a most part at the center of one surface 104a of the disk section 104 on the side opposite to the motor 1 with the decelerator (the right side in FIG. 1, and the front side in the paper surface in FIG. 4) in the radial direction. Bolt insertion holes 111 are formed to penetrate through the center of the recessed portion 109 in the radial direction at positions corresponding to the female screw sections 54 of the output section 44 in the motor 1 with the decelerator. Bolts 110 are inserted into the bolt insertion holes 111, and the bolts 110 are screwed into the female screw sections 54 of the output section 44. In this manner, the wheel 102 is fastened and secured to the output section 44 in a state in which the other surface 104b of the disk section 104 on the side opposite to the one surface 104a abuts on the other surface 51b of the output section 44. The output section 44 and the wheel 102 integrally rotate.

Figure 5:
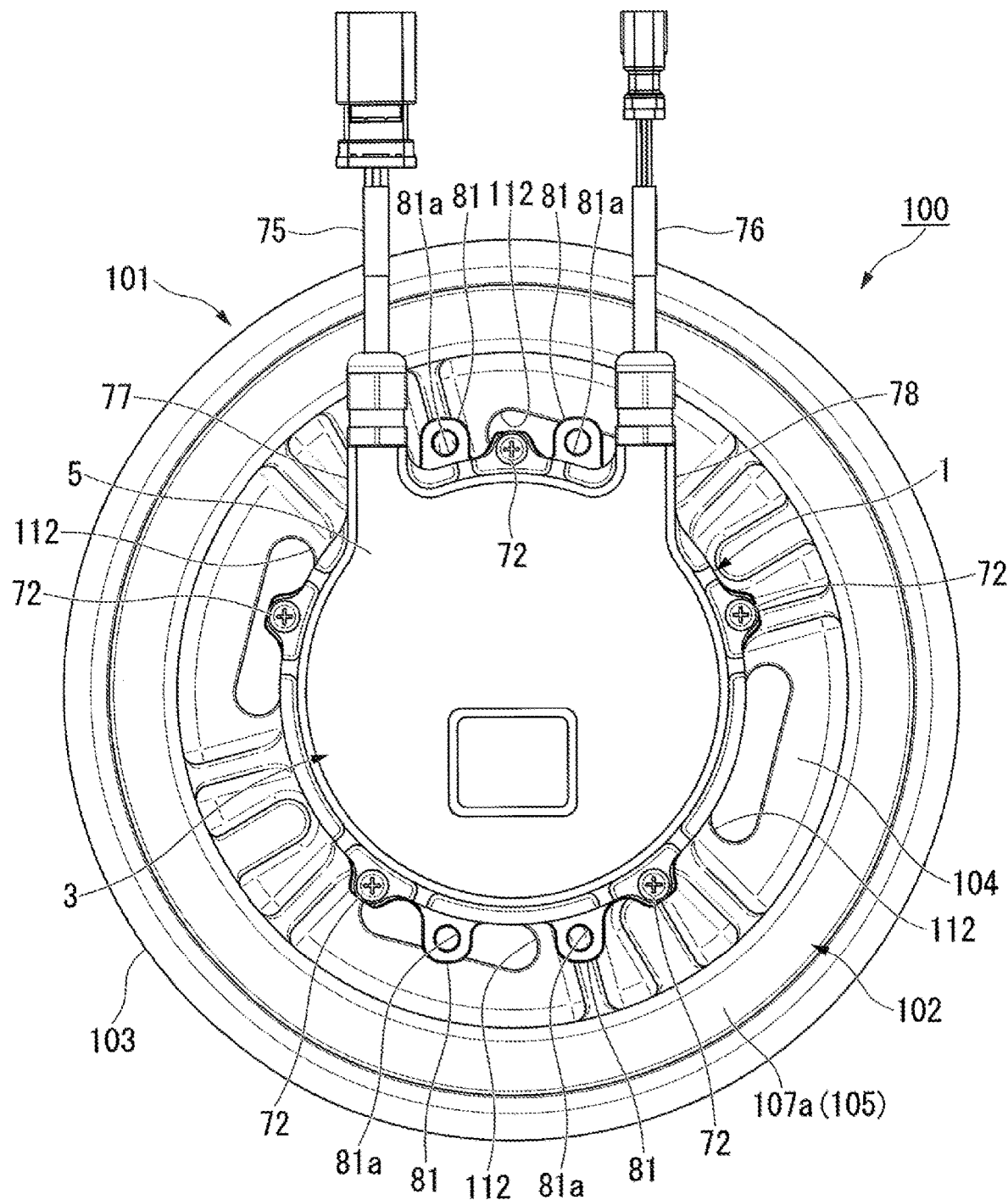
FIG. 5 is view from the arrow C in FIG. 1.

FIG. 5 is a view from the arrow C in FIG. 1.

As illustrated in FIG. 4 and FIG. 5, four long holes 112 are formed at locations near the outer periphery in the recessed portion 109 of the disk section 104 at equal intervals in the circumferential direction. The long holes 112 are linear and long circular holes that are long substantially along the circumferential direction. The long holes 112 have a function of reducing the weight of the wheel 102 and a function as an inlet port into which a tool such as a screwdriver is inserted.

The diameter of the recessed portion 109 is set to be larger than the outermost diameter of the casing 10 of the motor 1 with the decelerator. As described in detail in FIG. 5, the long holes 112 and the attachment stays 81 of the casing 10 face each other in the axial direction. Therefore, when the vehicle wheel drive device 100 is attached to a vehicle body, which is not illustrated, it is possible to insert bolts, which are not illustrated, from the outside in the vehicle width direction into the through-holes 81a of the attachment stays 81 via the long holes 112. It is possible to insert a tool, which is not illustrated, into the long holes 112 from the outside in the vehicle width direction and to fasten the bolts, which are not illustrated.

As illustrated in FIG. 3 and FIG. 4, the one surface 104a of the disk section 104 is provided with a wheel cover 113 fitted into the recessed portion 109. The wheel cover 113 is fastened and secured to the disk section 104 with a bolt 114. The bolts 110 exposed to the recessed portion 109 of the disk section 104 are covered with the wheel cover 113. The long holes 112 formed in the recessed portion 109 of the disk section 104 are covered. Therefore, design properties of the drive wheel 101 are enhanced.

Figure 6:
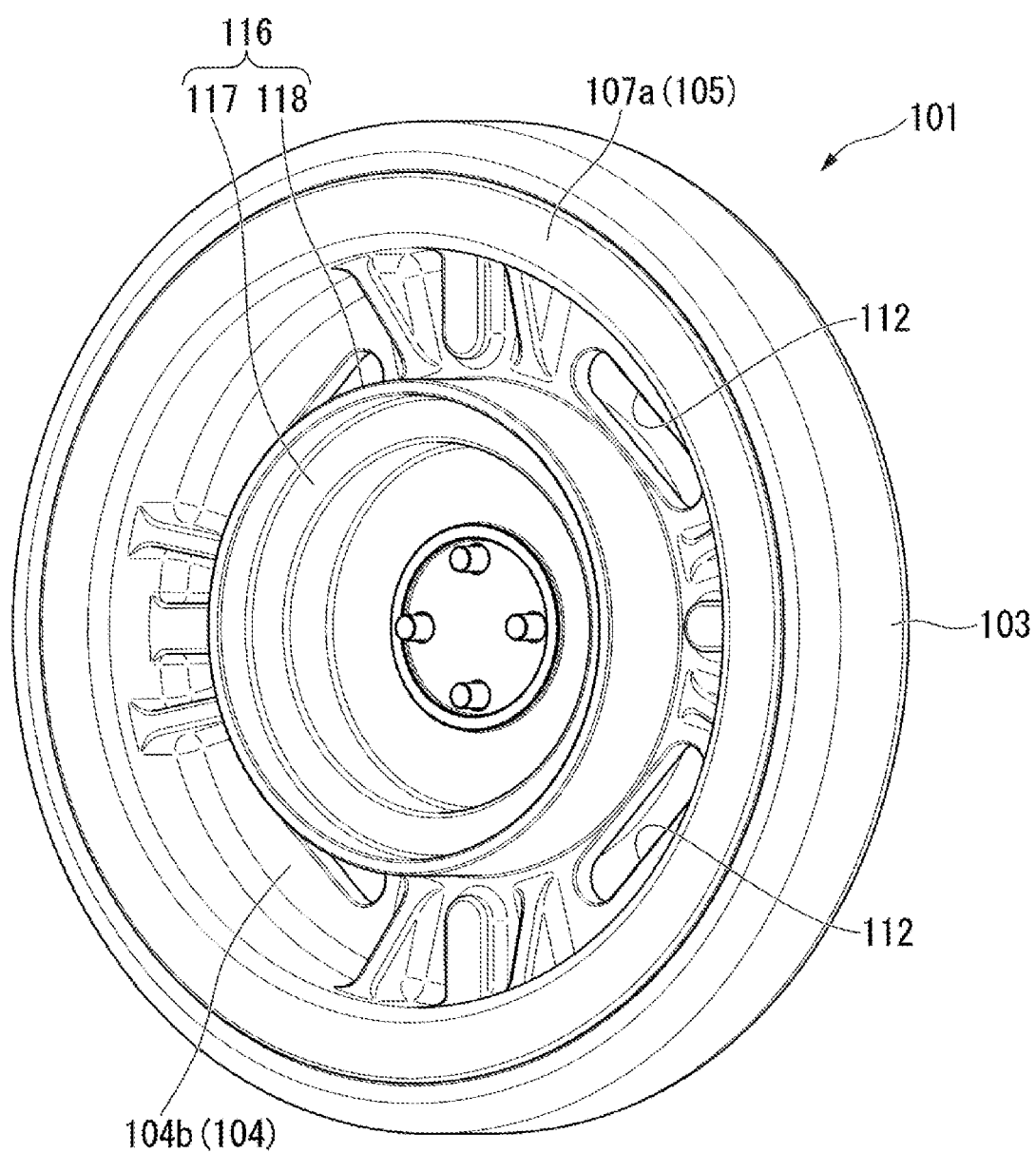
FIG. 6 is a perspective view of a drive wheel from the side of the motor with the decelerator according to the first embodiment of the present invention.

A spigot joint section 115 with a substantially annular shape in a plan view in the axial direction is molded integrally with the other surface 104b of the disk section 104 to slightly project therefrom. The inner peripheral edge of the spigot joint section 115 is fitted onto the output section main body 51 of the output section 44. In this manner, the positioning of the wheel 102 (disk section 104) relative to the output section 44 in the radial direction is performed. FIG. 6 is a perspective view of the drive wheel 101 when seen from the side of the motor 1 with the decelerator.

As illustrated in FIG. 1 and FIG. 6, a substantially cylindrical rib 116 that projects toward the first reduced diameter section 11a and a first step difference surface 11b is molded integrally with the other surface 104b of the disk section 104 at a position corresponding to the first reduced diameter section 11a and the first step difference surface 11b of the casing 10 of the motor 1 with the decelerator.

The rib 116 includes a first projecting portion 117 and a second projecting portion 118. The substantially cylindrical first projecting portion 117 projects until reaching immediately before the first step difference surface 11b of the casing 10 from the other surface 104b of the disk section 104. The second projecting portion 118 projects until further reaching immediately before the outer flange section 13 of the casing 10 from the outer peripheral portion of a first projecting portion 117, and is formed into a substantially cylindrical shape to cover the outer peripheral surface of the casing 10. In other words, the rib 116 is formed into a stepped shape corresponding to the outer peripheral surface with the stepped shape of the casing 10.

The inner diameter of the first projecting portion 117 is set to be slightly larger than the diameter of the first reduced diameter section 11a of the casing 10. The inner diameter of the second projecting portion 118 is set to be slightly larger than the outermost diameter of the bolt seat 17 of the casing 10. Therefore, the rib 116 and the casing 10 do not cause interference.

(Operations of Vehicle Wheel Drive Device)

Next, operations of the vehicle wheel drive device 100 will be described.

If a predetermined current is supplied to the coil 25 of the motor section 2 via the control section 3, a predetermined magnetic field is generated at the stator 21. Then, a magnetic suctioning force and a repulsive force are generated between the magnetic field and the ring magnet 33 of the rotor 22, and the rotor 22 rotates.

If the rotor 22 rotates, the eccentric shaft 41 that molded integrally with the rotation shaft 31 of the rotor 22 rotates. If the eccentric shaft 41 rotates, the rocking gear 43 rotates in response to the rotation. The rocking gear 43 is rotatably provided via the ball bearing 47 relative to the eccentric section 45 of the eccentric shaft 41, and the outer teeth 50a are engaged with the inner teeth 42a of the ring gear 42. Therefore, the rocking gear 43 revolves about the motor axial line L and rotates with a decelerated speed relative to the eccentric shaft 41 about a center O (see FIG. 3) of the eccentric section 45. Also, the output section 44 that is engaged with the inner teeth 50b of the rocking gear 43 is transmitted with the power with respect to the rocking gear 43 through rocking rotation of the rocking gear 43. In this manner, the output section 44 rotates.

If the output section 44 rotates, the drive wheel 101 integrated with the output section 44 rotates. In this manner, the vehicle body to which the vehicle wheel drive device 100 is attached, which is not illustrated, travels.

Since the outer peripheral surface of the casing 10 is covered with the rib 116 of the wheel 102, dust, rainwater, and the like are prevented from being direct contact with the motor section 2.

In the aforementioned first embodiment, the rib 116 that covers the outer peripheral surface of the casing 10 is formed on the wheel 102 in the other surface 104b of the disk section 104 to project therefrom. Therefore, it is possible to prevent dust, rainwater, and the like from coming into direct contact with the motor section 2. Thus, it is possible to provide the vehicle wheel drive device 100 with excellent dustproof and waterproof properties. Although the ball bearing 55 of the motor 1 with the decelerator is exposed to the outside via the opening of the bearing inner flange section 61 on the side of the inner peripheral edge, it is possible to reliably prevent dust, rainwater, and the like from entering the ball bearing 55 using the rib 116.

Since it is not necessary to separately provide a cover or the like at the motor section 2 (the motor 1 with the decelerator), it is possible to enhance versatility of the motor section 2 (the motor 1 with the decelerator) and to curb an increase in size of the motor section 2 (the motor 1 with the decelerator). It is also possible to prevent an increase in manufacturing costs of the motor section 2 (the motor 1 with the decelerator).

The rib 116 is formed into a stepped shape such that the shape of the inner peripheral surface corresponds to the outer peripheral surface with a stepped shape of the casing 10. Therefore, it is possible to form the clearance between the casing 10 and the rib 116 into a complicated shape. In other words, it is possible to complicate the entrance path of dust, rainwater, and the like entering inside from between the casing 10 and the rib 116. Thus, it is possible to provide the vehicle wheel drive device 100 with excellent dustproof and waterproof properties.

The long holes 112 formed in the disk section 104 of the wheel 102 and the attachment stays 81 of the casing 10 are disposed to face each other in the axial direction. Therefore, when the vehicle wheel drive device 100 is attached to the vehicle body, which is not illustrated, it is possible to insert bolts, which are not illustrated, into the through-holes 81a of the attachment stays 81 via the long holes 112 from the outside in the vehicle width direction. It is possible to insert a tool, which is not illustrated, into the long holes 112 from the outside in the vehicle width direction and to fasten the bolts, which are not illustrated. Thus, it is possible to improve operability of attachment of the drive wheel 101 to the motor 1 with the decelerator.

The plurality of (six in the embodiment, for example) bolt seats 17 that project outward in the radial direction and are disposed on the first step difference surface 11b are molded integrally with the first reduced diameter section 11a of the casing 10 of the motor 1 with the decelerator. The female screw section 17c for the stator is engraved in one surface 17a of each bolt seat 17, and the female screw section 17d for the external device is engraved in the other surface 17b at a location where the female screw section 17c for the stator is not engraved. It is possible to integrate locations at which the stator 21 and the external device are secured to the casing 10 by engraving the female screw sections 17c and 17d using both surfaces of each bolt seat 17. Therefore, it is possible to downsize the casing 10 and to improve design properties of the casing 10.

Second Embodiment

Next, a second embodiment will be described on the basis of FIG. 7 and FIG. 8 with reference to FIG. 2 and FIG. 3. Also, the same aspects as those in the first embodiment will be described by applying the same reference signs thereto (the same applies to the modification examples and a third embodiment described below).

Figure 7:
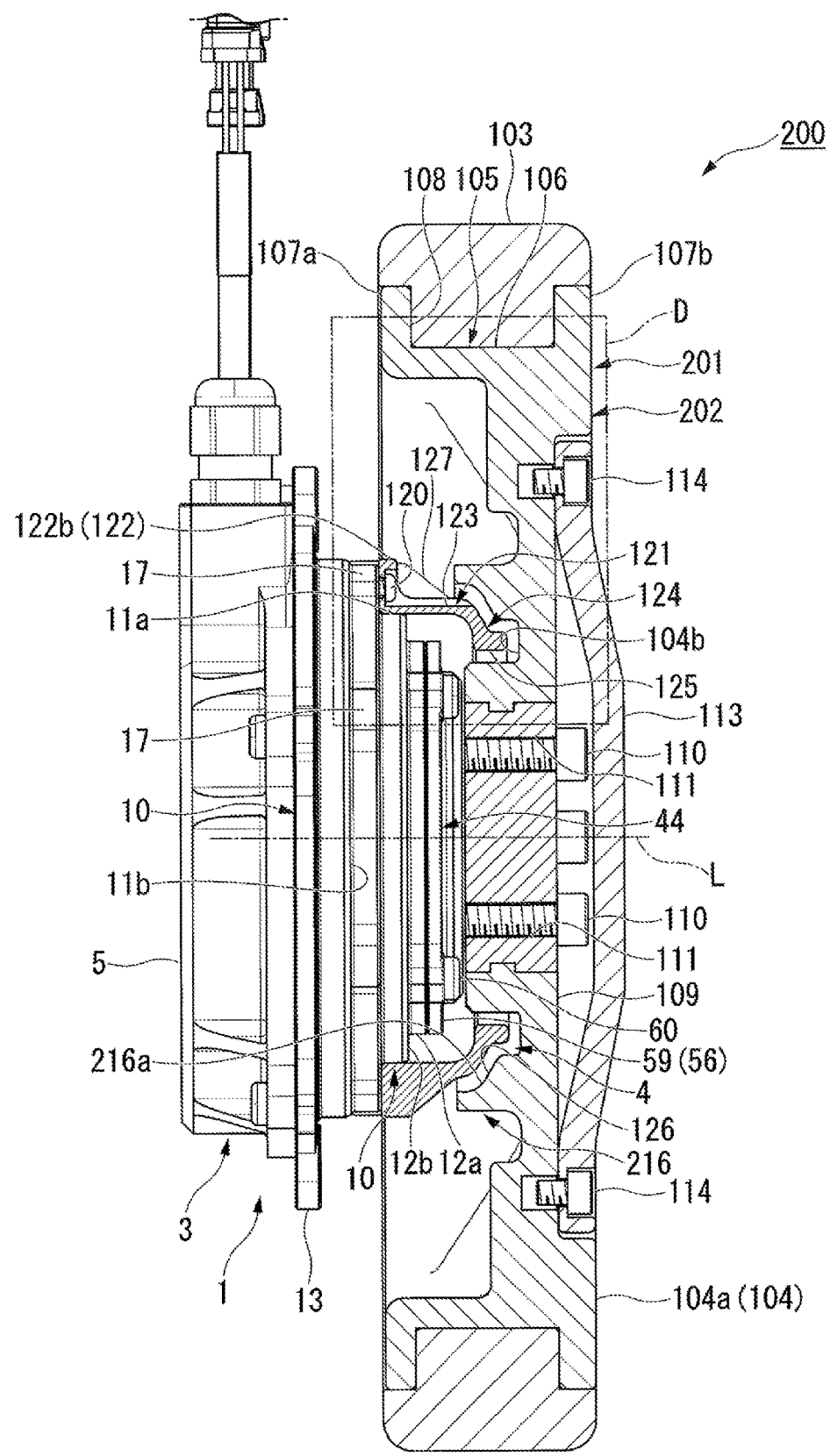
FIG. 7 is a diagram illustrating a section of a drive wheel of a vehicle wheel drive device according to a second embodiment of the present invention.

FIG. 7 is a diagram illustrating a section of a drive wheel 201 of a vehicle wheel drive device 200 according to the second embodiment. FIG. 8 is a perspective view illustrating a state in which the motor cover 121 is attached to the motor 1 with the decelerator.

Figure 8:
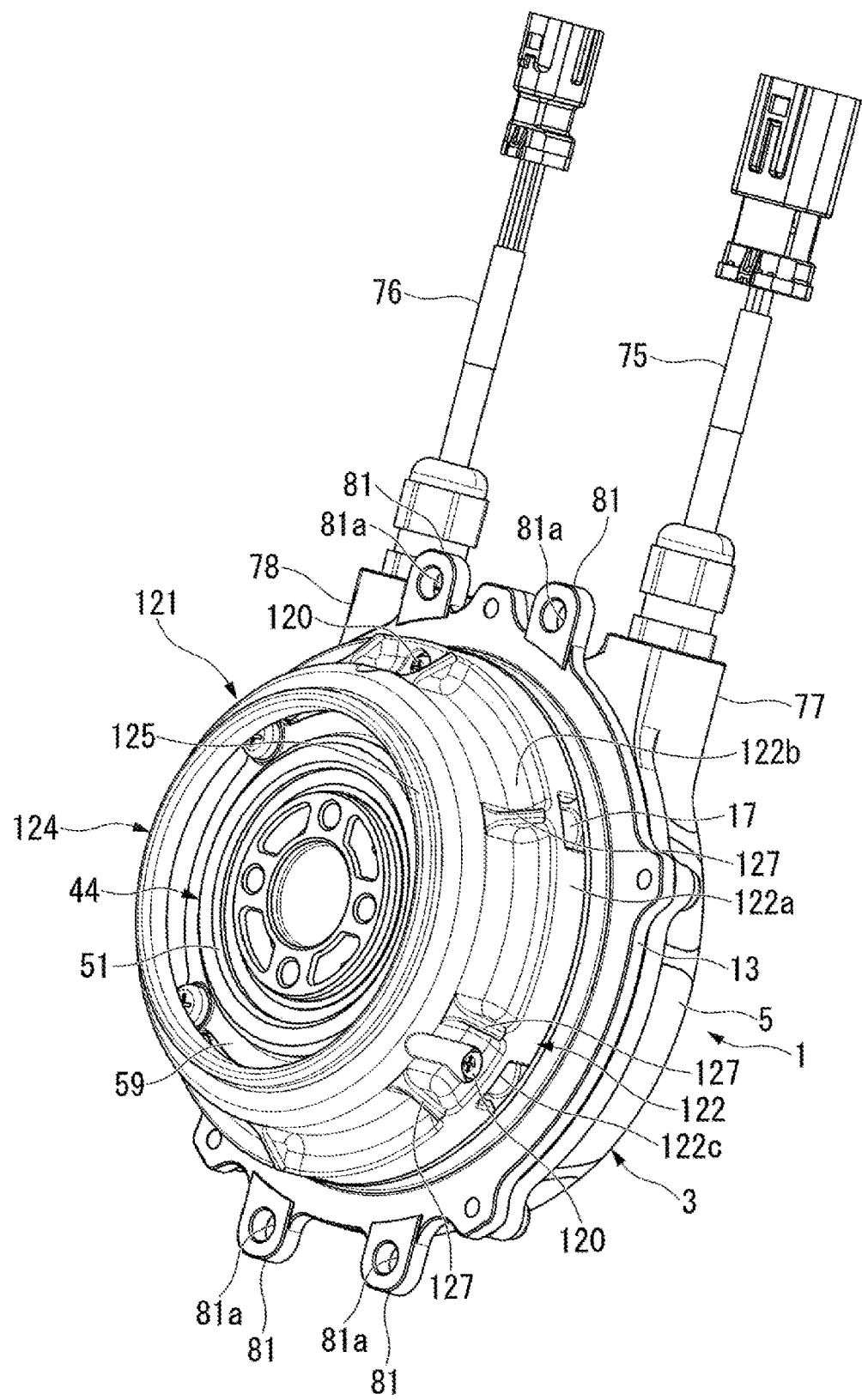
FIG. 8 is a perspective view illustrating a state in which a motor cover is attached to a motor with a decelerator according to the second embodiment of the present invention.

As illustrated in FIG. 7 and FIG. 8, the second embodiment is similar to the aforementioned first embodiment in that the vehicle wheel drive device 200 includes the motor 1 with the decelerator and a drive wheel 201 attached to the output shaft 44 of the motor 1 with the decelerator, which will be described later. The motor 1 with the decelerator is similar to that in the aforementioned first embodiment in that the motor 1 with the decelerator is attached such that the motor axial line L follows the vehicle width direction (horizontal direction) and the motor 1 with the decelerator is disposed inside the vehicle body in the vehicle width direction.

In the second embodiment, the motor cover 121 is attached to the motor 1 with the decelerator. A rib 216 of a wheel 202 in the second embodiment is formed to correspond to the shape of the motor cover 121. These points are different from those in the aforementioned first embodiment.

More specifically, the motor cover 121 is fastened and secured to the bolt seats 17 (see FIG. 2 and FIG. 3) of the motor 1 with the decelerator with bolts 120 (see FIG. 7 and FIG. 8). In the motor cover 121, a substantially annular secured section 122 that is secured to the bolt seats 17, a substantially cylindrical cover main body 123 that projects from the secured section 122 toward the side of the drive wheel 201 in the axial direction, and an inner flange section 124 that extends obliquely inward in the radial direction from the distal end of the cover main body 123 (the end on the side of the drive wheel 201, the right end in FIG. 7) with a diameter gradually reduced are integrally molded.

The secured section 122 is formed into a substantially annular shape when seen from the axial direction to cover the outer peripheral surface of the stage of the outer peripheral surface of the casing 10 where the bolt seats 17 are formed. The secured section 122 is formed to have a substantially L-shaped section by an outer peripheral wall 122a and an end wall 122b that covers end surfaces of the bolt seats 17 in the axial direction. The cover main body 123 extends to be bent from the inner peripheral edge of the end wall 122b.

The outer diameter of the outer peripheral wall 122a of the secured section 122 is set to be substantially the same as the outer diameter of the casing 10. Therefore, notches 122c for avoiding interference with the bolt seats 17 are formed at positions corresponding to the bolt seats 17 in the outer peripheral wall 122a.

Through-holes into which the bolts 120 can be inserted, which is not illustrated, are formed at locations where the female screw sections 17d for an external device are formed from among positions corresponding to the bolt seats 17 in the end wall 122b. The motor cover 121 is fastened and secured to the bolt seat 17 by inserting the bolts 120 into the through-holes from the side of the drive wheel 201 and screwing the bolts 120 into the female screw sections 17d for an external device.

A plurality of reinforcing ribs 127 that extends across the end wall 122b and the cover main body 123 are formed between the end wall 122b and the outer peripheral surface of the cover main body 123. These reinforcing ribs 127 enhance mechanical strength of the motor cover 121.

The inner diameter of the cover main body 123 is set to be slightly larger than the outer diameter of the first reduced diameter section 11a of the casing 10.

The inner flange section 124 provided at the distal end of the cover main body 123 is formed such that the diameter of the inner peripheral edge thereof is slightly larger than the outer diameter of the guide main body 57 of the guide section 56 provided at the motor 1 with the decelerator. A cylindrical reinforcing rib 125 is molded integrally with the inner peripheral edge of the inner flange section 124. The reinforcing rib 125 enhances mechanical strength of the inner flange section 124.

The rib 216 of the wheel 202 is formed into a substantially cylindrical shape to cover a portion of the outer peripheral surface of the motor cover 121 from the distal end of the reinforcing rib 125 to the distal end portion of the cover main body 123. The inner peripheral surface 216a of the rib 216 is formed to correspond to the shape from the distal end of the reinforcing rib 125 of the motor cover 121 to the distal end portion of the cover main body 123. In other words, the inner peripheral surface of the rib 216 is formed to have a diameter that gradually increases from the disk section 104 toward the motor 1 with the decelerator. The rib 216 and the motor cover 121 overlap with each other in the radial direction by forming the rib 216 in this manner.

In the aforementioned second embodiment, the casing 10 of the motor 1 with the decelerator is provided with the motor cover 121, and the rib 216 of the wheel 202 is formed to cover a part of the outer peripheral surface of the motor cover 121. The part of the motor cover 121 and the rib 216 overlap with each other in the radial direction. Therefore, the part of the motor cover 121 and the rib 216 form a labyrinth section 126. Therefore, it is possible to further complicate the entrance path of dust, rainwater, and the like entering the inside from between the casing 10 and the rib 216 and to provide the vehicle wheel drive device 200 with excellent dustproof and waterproof properties.

It is possible to simplify the structure of the motor cover 121 and to downsize the motor cover 121 using the motor cover 121 of the motor 1 with the decelerator and the rib 216 of the wheel 202 together as compared with a case in which the vehicle wheel drive device 200 with excellent dustproof and waterproof properties is provided only with the motor cover 121.

Figure 9:
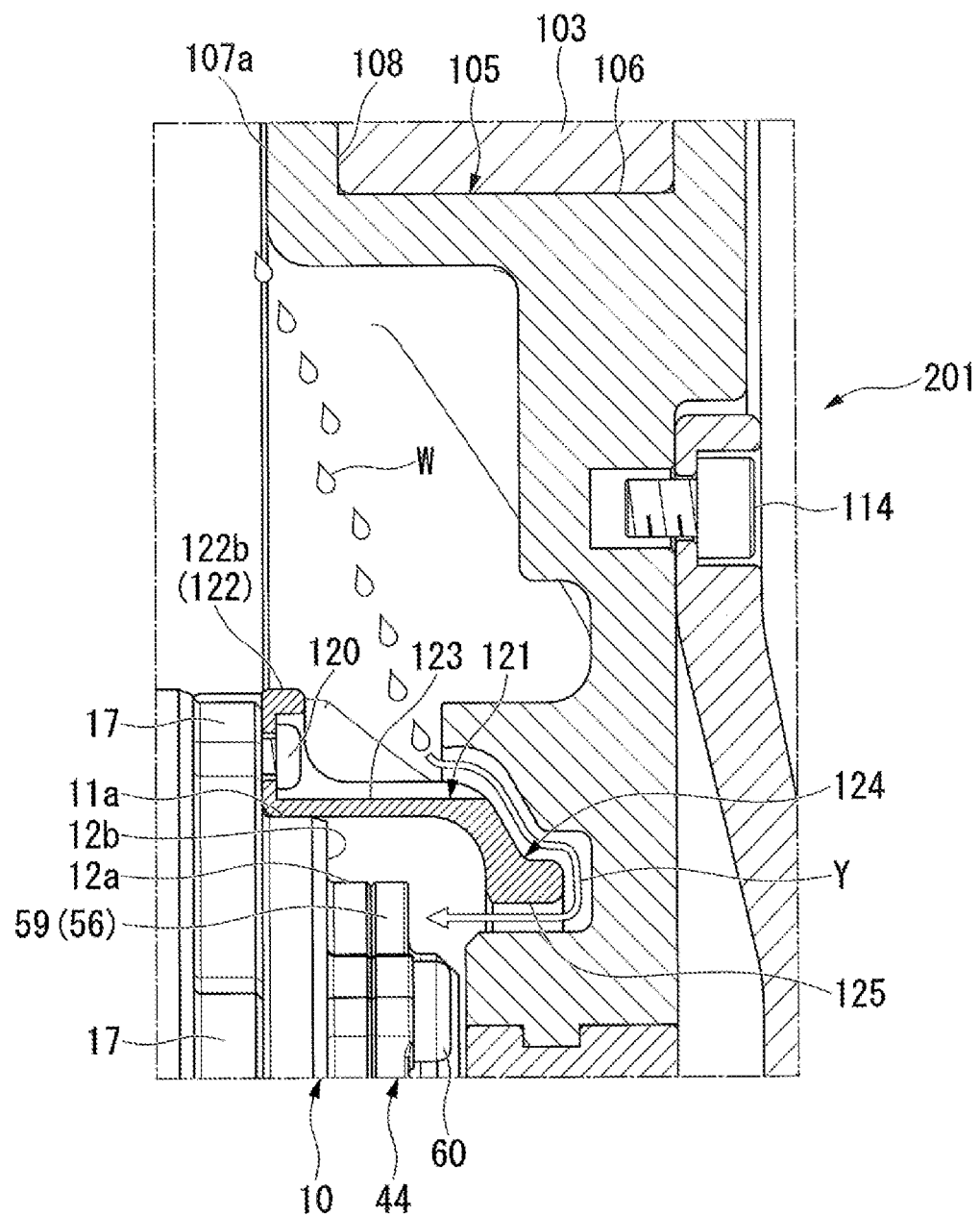
FIG. 9 is an enlarged view of the portion D in FIG. 7.

FIG. 9 is an enlarged view of the portion D in FIG. 7.

In the aforementioned second embodiment, the motor cover 121 has the substantially cylindrical cover main body 123 and the inner flange section 124 that extends obliquely inward in the radial direction from the distal end of the cover main body 123 with a diameter gradually reduced.

Therefore, in a case in which rainwater W enters inside from the inside of the wheel 202 in the vehicle width direction (the left side in FIG. 9), for example, as illustrated in FIG. 9, there is a probability that the rainwater W flows along the outer peripheral surface of the motor cover 121, flows into the center of the wheel 202 in the radial direction, and reaches the output section 44 of the motor 1 with the decelerator, due to the weight of the rainwater W itself (see the arrow Y in FIG. 9). Thus, the motor cover 121 may be configured as a motor cover 221 according to the following modification example.

(Modification Example of Second Embodiment)

Figure 10:
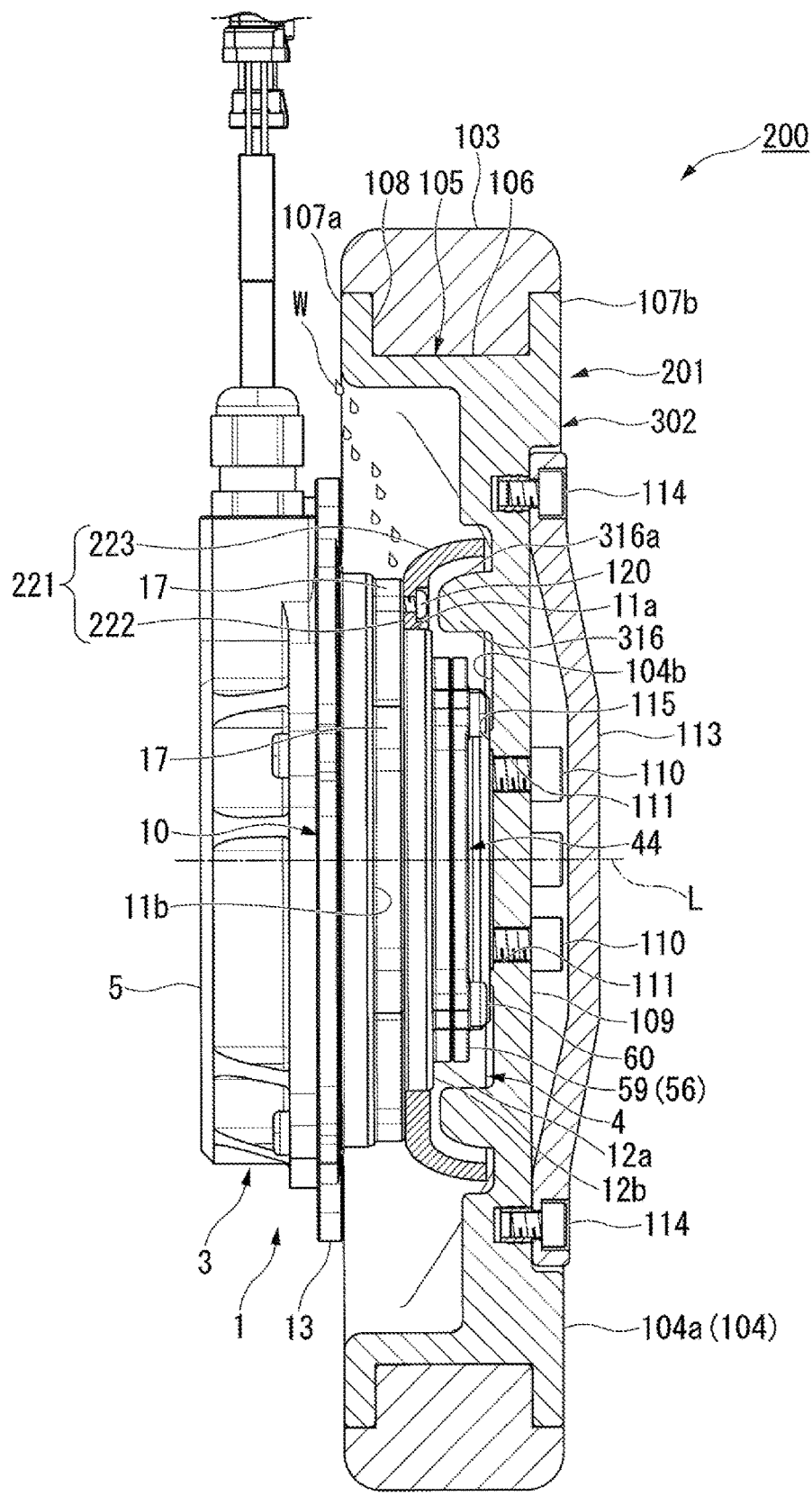
FIG. 10 is a diagram illustrating a section of a drive wheel of a vehicle wheel drive device according to a modification example of the second embodiment of the present invention.

FIG. 10 is a diagram of a section of the drive wheel 201 of the vehicle wheel drive device 200 according to the modification example of the second embodiment and corresponds to FIG. 7 described above.

As illustrated in FIG. 10, the motor cover 221 is adapted such that a secured section 222 with a substantially annular shape when seen from the axial direction and a cover main body 223 that extends from the outer peripheral edge of the secured section 222 toward the side of the drive wheel 201 are integrally molded.

The secured section 222 is fastened and secured to the bolt seats 17 with the bolts 120. The cover main body 223 is formed to have a widened bottom such that the diameter increases while being gradually bent from the outer peripheral edge of the secured section 222 toward the side of the drive wheel 201.

A rib 316 of a wheel 302 is disposed on the side of the inner peripheral surface of the motor cover 221. The rib 316 is formed into a substantially cylindrical shape. An outer peripheral surface 316a of the rib 316 is formed in a bent manner to correspond to the shape of an inner peripheral surface 223a of the cover main body 223. The cover main body 223 of the motor cover 221 and the rib 316 overlap with each other in the radial direction.

Since the cover main body 223 of the motor cover 221 is formed to have a widened bottom, the rainwater W does not advance to the inside of the wheel 302 in the radial direction along the outer peripheral surface of the cover main body 223 due to the weight of the rainwater W itself even in a case in which the rainwater W enters the inside of the wheel 302 in the vehicle width direction (the left side in FIG. 10), for example.

Therefore, it is possible to more reliably prevent rainwater and the like from coming into contact with the output section 44 of the motor 1 with the decelerator according to the aforementioned modification example of the second embodiment, in addition to advantages that are similar to those of the aforementioned second embodiment.

The case in which the ribs 116, 216, and 316 are molded integrally with the other surface 104b of the disk section 104 has been described in the first embodiment, the second embodiment, and the modification example of the second embodiment described above. However, the present invention is not limited thereto, and the disk section 104 and the ribs 116, 216, and 316 may be configured as separate elements, and the ribs 116, 216, and 316 may be attached to the disk section 104.

Third Embodiment

Next, a third embodiment will be described on the basis of FIG. 11 and FIG. 12.

Figure 11:
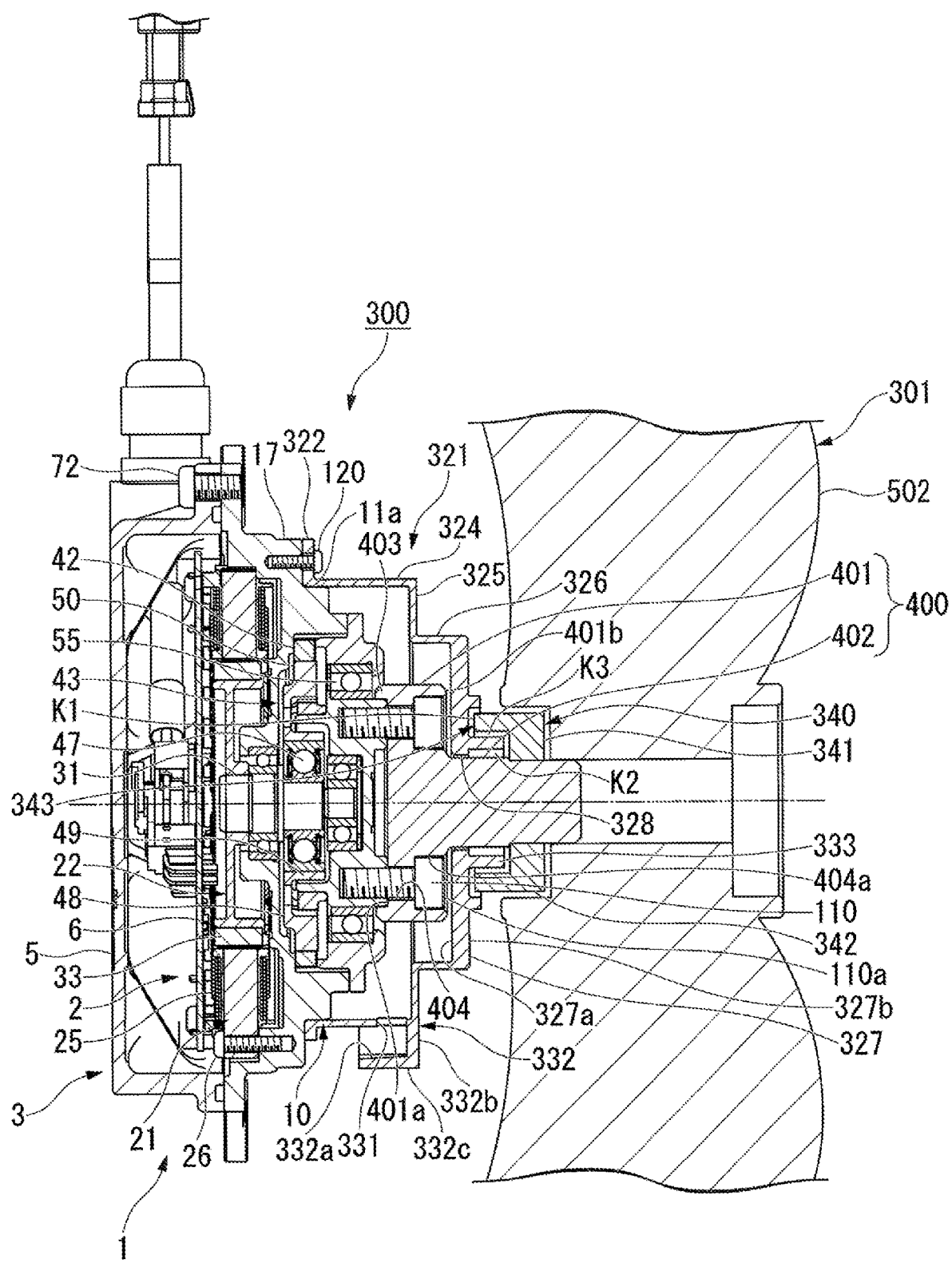
FIG. 11 is a sectional view of a vehicle wheel drive device according to a third embodiment of the present invention.

FIG. 11 is a sectional view of a vehicle wheel drive device 300 according to the third embodiment.

As illustrated in FIG. 11, the third embodiment is similar to the aforementioned first embodiment in that the vehicle wheel drive device 300 includes the motor 1 with the decelerator and a drive wheel 301. Also, the motor 1 with the decelerator is also similar to that in the aforementioned first embodiment in that the motor 1 with the decelerator is attached such that the motor axial line L follows the vehicle width direction (horizontal direction) and the motor 1 with the decelerator is disposed inside the vehicle body in the vehicle width direction.

In the third embodiment, an attachment shaft 400 is provided as an element that configures a part of the output section 44 of the motor 1 with the decelerator. The drive wheel 301 is attached to the output section 44 via the attachment shaft 400. In the third embodiment, the drive wheel 301 is not provided with the ribs 116, 216, and 316 unlike the first embodiment, the second embodiment, and the modification example of the second embodiment described above, and a motor cover 321 is attached to the motor section 2. These points are different from those in the first embodiment, the second embodiment, and the modification example of the second embodiment described above.

(Attachment Shaft)

More specifically, a substantially disk-shaped base section 401 that abuts on the other surface 51b of the output section 44 and an output shaft 402 that projects along the axial direction from the center of the base section 401 in the radial direction toward the side opposite to the output section 44 are integrally molded in the attachment shaft 400. A substantially cylindrical shaped spigot joint section 403 that extends from one surface 401a that abuts on the other surface 51b of the output section 44 is molded integrally with the outer peripheral edge of the base section 401. The inner peripheral edge of the spigot joint section 403 is fitted onto the output section main body 51 of the output section 44. In this manner, the attachment shaft 400 is positioned in the radial direction relative to the output section 44.

Bolt insertion holes 404 are formed in the base section 401 at positions corresponding to the female screw sections 54 of the output section 44. The attachment shaft 400 is fastened and secured to the output shaft 44 in a state in which the one surface 401a of the base section 401 abuts on the other surface 51b of the output shaft 44 by inserting the bolts 110 into the bolt insertion holes 404 and screwing the bolts 110 into the female screw sections 54 of the output section 44. In this manner, the output section 44 and the attachment shaft 400 integrally rotate.

Counterbored sections 404a with increased diameters are formed by a step difference in the bolt insertion holes 404 on the side of the other surface 401b on the side opposite to the one surface 401a of the base section 401. Since head portions 110a of the bolts 110 are accommodated in the counterbored sections 404a, the head portions 110a of the bolts 110 do not project from the other surface 401b of the base section 401.

The output shaft 402 projecting form the base section 401 is disposed such that the axial center is located on the same axis as the motor axial line L (the rotation axial line of the output section 44). A wheel 502 of the drive wheel 301 is attached to the distal end of the base section 401.

(Motor Cover)

The motor cover 321 attached to the motor section 2 is fastened and secured to the bolt seats 17 of the motor 1 with the decelerator using the bolts 120.

Figure 12:
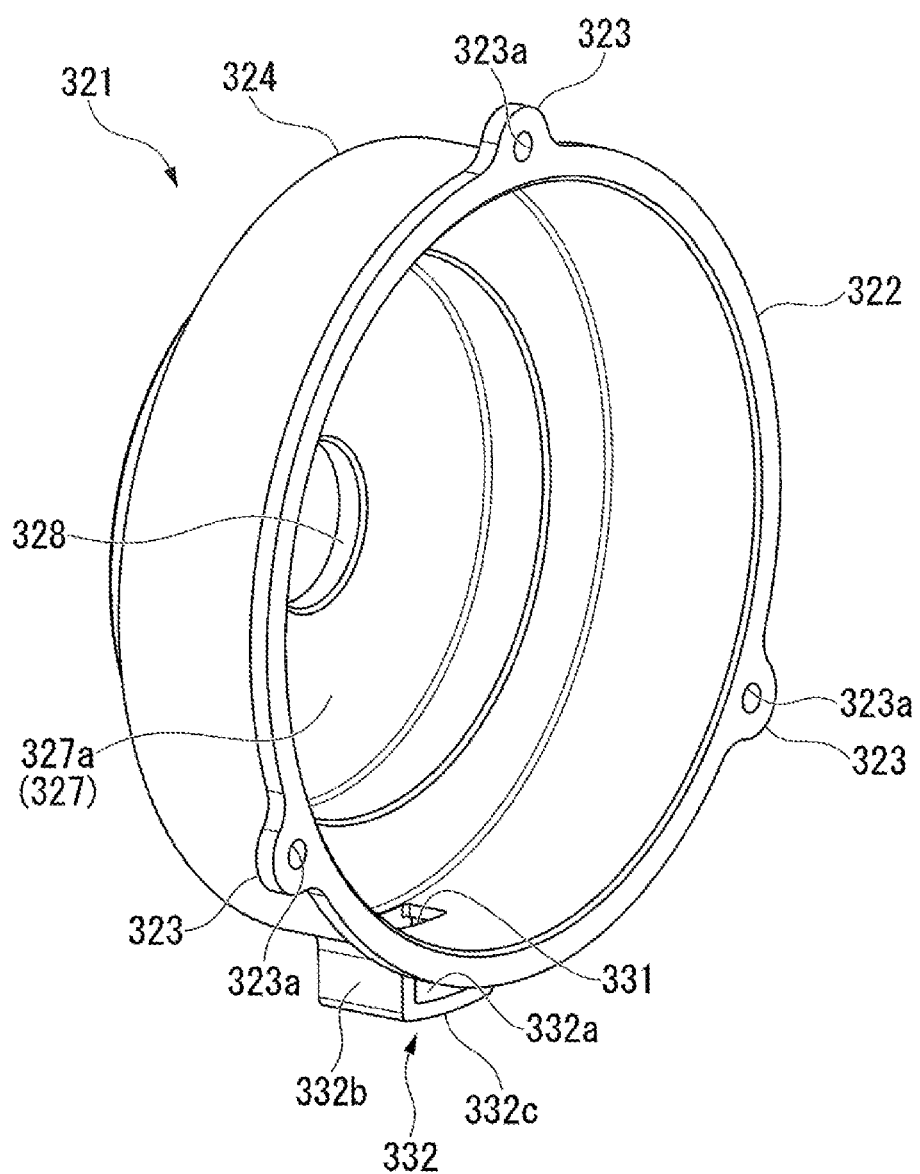
FIG. 12 is a perspective view of a motor cover according to the third embodiment of the present invention.

FIG. 12 is a perspective view of the motor cover 321.

As illustrated in FIG. 11 and FIG. 12, the motor cover 321 has a substantially annular secured section 322 secured to the bolt seats 17. Base seats 323 are formed in the secured section 322 to project outward in the radial direction at positions corresponding to the bolt seats 17 of the motor 1 with the decelerator. Through-holes 323a into which the bolts 120 can be inserted are formed in the base seats 323. The motor cover 321 is fastened and secured to the casing 10 by inserting the bolts 120 into the through-holes 323a and screwing the distal ends of the bolts 120 into the female screw sections 17d for an external device of the bolt seats 17.

A first cylindrical section 324 with a substantially cylindrical shape that projects toward the side of the drive wheel 301 is molded integrally with the inner peripheral edge of the secured section 322. A proximal end portion of the first cylindrical section 324 on the side of the secured section 322 is fitted onto the first reduced diameter section 11a of the casing 10.

A drainage section 330 is provided on the side of the distal end of the first cylindrical section 324 on the side opposite to the secured section 322 at a location corresponding to the lowermost portion in the weight direction (the lower portion in FIG. 11) in a state in which the motor axial line L of the motor 1 with the decelerator is caused to follow the horizontal direction.

The drainage section 330 is configured of a drainage hole 331 formed in the first cylindrical section 324 and a protection cover 332 that covers the drainage hole 331 form the outside in the radial direction. The drainage hole 331 is formed into a substantially square shape when seen from the radial direction and establishes communication between the inside and the outside of the first cylindrical section 324. The protection cover 332 is formed into a box shape that has an opening portion 332a on the side of the motor section 2 (the right side in FIG. 11). In other words, the protection cover 332 has three side walls 332b that project downward from the first cylindrical section 324 and are disposed in a substantially C shape when seen in the weight direction and a bottom wall 332c that extends up to the lower ends of the three side walls 332b.

A second cylindrical section 326 that is formed to have a further reduced diameter as compared with the first cylindrical section 324 via a step difference surface 325 is molded integrally with the distal end of the first cylindrical section 324. The inner diameter of the second cylindrical section 326 is set to be larger than the outer diameter of the base section 401 of the attachment shaft 400.

A substantially disk-shaped ceiling 327 is molded integrally with the distal end of the second cylindrical section 326 on the side opposite to the step difference surface 325. One surface 327a of the ceiling 327 on the side of the base section 401 abuts on the other surface 401b of the base section 401. A through-hole 328 into which the output shaft 402 of the attachment shaft 400 can be inserted is formed at the center of the ceiling 327 in the radial direction. The distal end of the output shaft 402 projects from the motor cover 321 through the through-hole 328.

A third inner cylindrical section 333 that projects from a slightly outside in the radial direction beyond the peripheral edge of the through-hole 328 is formed in the other surface 327b on the side opposite to the one surface 327a of the ceiling 327. A third outer cylindrical section 334 is formed in the other surface 327b of the ceiling 327 to project from the outside in the radial direction beyond the third inner cylindrical section 333. The projecting height of the third outer cylindrical section 334 set to be lower than the projecting height of the third inner cylindrical section 333. The third inner cylindrical section 333 and the third outer cylindrical section 334 cooperate with a sealing section 340, which will be described later, to form a labyrinth section 343.

The sealing section 340 is attached to the output shaft 402 of the attachment shaft 400 on the side of the distal end.

The sealing section 340 configures a part of the wheel 502 and is formed of rubber with elasticity. The sealing section 340 is formed to cover the third inner cylindrical section 333 from the side of the wheel 502. In other words, in the sealing section 340, a disk section 341 attached to the output shaft 402 and a sealing cylindrical section 342 that projects from the outer peripheral portion of the disk section 341 toward the ceiling 327 of the motor cover 321 are integrally molded.

A through-hole 341a is formed at the center of the disk section 341 in the radial direction. The output shaft 402 is press-fitted into the through-hole 341a. In this manner, the sealing section 340 is secured to the output shaft 402.

The distal end of the sealing cylindrical section 342 is sandwiched between the third inner cylindrical section 333 and the third outer cylindrical section 334 of the motor cover 321. A predetermined clearance K1 is formed between the sealing cylindrical section 342 and the other surface 327b of the ceiling 327. Also, a clearance K2 with an annular shape when seen from the axial direction is also formed between the inner peripheral surface of the sealing cylindrical section 342 and the outer peripheral surface of the third inner cylindrical section 333. Further, a clearance K3 with an annular shape when seen from the axial direction is also formed between the outer peripheral surface of the sealing cylindrical section 342 and the inner peripheral surface of the third outer cylindrical section 334. Also, the clearances K1 to K3 and the ceiling 327, the third inner cylindrical section 333, the third outer cylindrical section 334, and the sealing section 340 that form the clearances K1 to K3 form the labyrinth section 343 that provides a complicated entrance path for rainwater and the like.

If the motor 1 with the decelerator is driven with such a configuration, the attachment shaft 400 and the drive wheel 301 rotate integrally with the output section 44. At this time, the sealing section 340 secured to the attachment shaft 400 also rotates integrally with the attachment shaft 400. Since the predetermined clearances K1 to K3 are formed between the sealing section 340 and the motor cover 321, sliding resistance does not occur between the sealing section 340 and the motor cover 321.

Also, since the labyrinth section 343 is formed between the sealing section 340 and the motor cover 321, an entrance path of rainwater from the outside to the inside of the motor cover 321 in the labyrinth section 343 is complicated. Therefore, waterproof properties between the sealing section 340 and the motor cover 321 are maintained.

In a case in which rainwater and the like enter the inside of the motor cover 321, and dew condensation occurs in the motor cover 321, water drops move along the inner peripheral surface of the motor cover 321 to the lower portion in the weight direction. The water drops that have moved to the lower portion are discharged to the outside via the drainage section 330.

The drainage section 330 has the box-shaped protection cover 332 to cover the drainage hole 331. Since the protection cover 332 is adapted such that only the opening portion 332a is formed in one surface in the horizontal direction, it is possible to curb entrance of rainwater and the like from the outside into the motor cover 321 via the drainage section 330 while smoothly discharging the water drops to the outside via the drainage hole 331. Thus, it is possible to provide the vehicle wheel drive device 300 with excellent dustproof and waterproof properties.

The motor section 2 and the decelerating mechanism 4 are completely covered with the casing 10 and the motor cover 321 that is fastened and secured to the casing 10. Therefore, it is possible to reliably prevent entrance of rainwater and dust into the motor section 2 and the decelerating mechanism 4 as compared with the first embodiment and the second embodiment described above.

The motor cover 321 is configured mainly of the secured section 322, the first cylindrical section 324, the step difference surface 325, the second cylindrical section 326, and the ceiling 327 and is formed into a stepped shape to follow the outer peripheral surface shapes of the casing 10, the decelerating mechanism 4, and the attachment shaft 400. Therefore, it is possible to minimize an occupation space of the motor cover 321 and to prevent dust, rainwater, and the like from coming into direct contact with the motor section 2 and the decelerating mechanism 4.

The present invention is not limited to the aforementioned embodiments and includes various modifications added to the aforementioned embodiments without departing from the gist of the present invention.

For example, the case in which the motor 1 with the decelerator includes the flat-shaped motor section 2 that is configured as a so-called DC brushless motor, the control section 3 that performs drive control of the motor section 2, and the decelerating mechanism 4 that receives a rotation force of the motor section 2 and is driven has been described in the aforementioned embodiments. Also, the case in which the decelerating mechanism 4 is configured as a so-called hypocycloid decelerating mechanism has been described. However, the present invention is not limited thereto, and various motors and decelerating mechanisms can be employed.

The case in which the wheels 102, 202, and 302 of the drive wheels 101 and 201 are fastened and secured to the output section 44 of the decelerating mechanism 4 has been described in the first embodiment and the second embodiment described above. However, in a case in which various rotational electric devices are used, for example, the shapes of the ribs 116, 216, and 316 provided at the wheels 102, 202, and 302 may be changed in accordance with outline shapes of the rotational electric devices employed.

The case in which the drive wheel 101 is employed as a rotating member has been described in the aforementioned embodiments. However, the present invention is not limited thereto, and various rotating members can be employed.

In the aforementioned third embodiment, the case in which the motor cover 321 is configured mainly of the secured section 322, the first cylindrical section 324, the step difference surface 325, the second cylindrical section 326, and the ceiling 327 and is formed into a stepped shape to follow the outer peripheral surface shapes of the casing 10, the decelerating mechanism 4, and the attachment shaft 400 has been described. However, the present invention is not limited thereto, and the shape of the motor cover 321 may be changed in accordance with the outline shape of the rotational electric device employed.

In the aforementioned third embodiment, the case in which the sealing section 340 is attached to the attachment shaft 400 on the side of the distal end of the output shaft 402 has been described. However, the present invention is not limited thereto, and the sealing section 340 may be provided directly at the wheel 502.

INDUSTRIAL APPLICABILITY

According to the aforementioned drive device, it is possible to prevent dust, rainwater, and the like from coming into direct contact with the motor section using the waterproof cover. Thus, it is possible to provide a drive device with excellent dustproof and waterproof properties.

What is claimed is:

1. A drive device comprising:
    a motor section which has a motor case formed to have a reduced diameter via gradual step differences in one direction;
    a decelerating section which is disposed on a furthest side of the motor case in the one direction and which has an output shaft configured to decelerate and output an output of the motor section; and
    a rotating member which is disposed on a side of the one direction beyond the decelerating section and is coupled to and rotates with the output shaft,
    wherein at least either the motor section or the rotating member is provided with a waterproof cover formed to surround a periphery of the motor case, and
    an inner peripheral surface of the waterproof cover is formed into a stepped shape to follow an outer peripheral surface of the motor case,
    wherein the motor section is provided with a second motor cover,
    the second motor cover includes:
        a cover main body which is formed into a stepped shape to follow the outer peripheral surface of the motor case, and
        an output shaft cover section which is formed into a tubular shape to surround a periphery of the output shaft extending from the cover main body to the side of the one direction, and
        the second motor cover is the waterproof cover,
    wherein the rotating member has a sealing section which covers the output shaft cover section from the side of the one direction, and
    the sealing section and the output shaft cover section form a labyrinth section that is an annular clearance.

2. The drive device according to claim 1, wherein
the rotating member is a wheel which has:
- a disk section with a disk shape which is secured to the output shaft, and
- a rim section, which extends in an axial direction of the output shaft from an outer peripheral portion of the disk section, to which a tire is attached, the disk section is provided with a rib which surrounds a periphery of the motor section, and
the rib is the waterproof cover.

3. The drive device according to claim 2, wherein
the motor section is provided with a first motor cover with a tubular shape which projects toward the disk section,
the first motor cover and the rib at least partially overlap in a radial direction of the output shaft, and
the first motor cover and the rib are the waterproof cover.

4. The drive device according to claim 1, wherein
the motor section and the decelerating section are disposed such that an axial direction follows a horizontal direction,
a drainage section is formed at a lower part of the cover main body in a weight direction, and
the drainage section includes:
- a drainage hole which is formed in a side surface of the cover main body, and
- a box-shaped protection cover which is formed in the side surface of the cover main body to cover the drainage hole from an outside in a radial direction and which has one surface in the horizontal direction opened.

5. A drive device comprising:
- a motor section which has a motor case formed to have a reduced diameter via gradual step differences in one direction;
- a decelerating section which is disposed on a furthest side of the motor case in the one direction and which has an output shaft configured to decelerate and output an output of the motor section; and
- a rotating member which is disposed on a side of the one direction beyond the decelerating section and is coupled to and rotates with the output shaft, wherein at least either the motor section or the rotating member is provided with a waterproof cover formed to surround a periphery of the motor case, and
an inner peripheral surface of the waterproof cover is formed into a stepped shape to follow an outer peripheral surface of the motor case,
wherein the motor section is provided with a second motor cover,
the second motor cover includes:
- a cover main body which is formed into a stepped shape to follow the outer peripheral surface of the motor case, and
- an output shaft cover section which is formed into a tubular shape to surround a periphery of the output shaft extending from the cover main body to the side of the one direction, and the second motor cover is the waterproof cover,
wherein the motor section and the decelerating section are disposed such that an axial direction follows a horizontal direction,
a drainage section is formed at a lower part of the cover main body in a weight direction, and
the drainage section includes:
- a drainage hole which is formed in a side surface of the cover main body, and
- a box-shaped protection cover which is formed in the side surface of the cover main body to cover the drainage hole from an outside in a radial direction and which has one surface in the horizontal direction opened.

* * * * *